(12) United States Patent
Tishbi (10) Patent No.: US 11,847,342 B2
(45) Date of Patent: Dec. 19, 2023

(54) EFFICIENT TRANSFER OF HARD DATA AND CONFIDENCE LEVELS IN READING A NONVOLATILE MEMORY

(71) Applicant: Apple Inc., Cupertino, CA (US)

(72) Inventor: Nir Tishbi, Kfar Saba (IL)

(73) Assignee: APPLE INC., Cupertino, CA (US)

( * ) Notice: Subject to any disclaimer, the term of this patent is extended or adjusted under 35 U.S.C. 154(b) by 86 days.

(21) Appl. No.: 17/512,712

(22) Filed: Oct. 28, 2021

(65) Prior Publication Data

US 2023/0034098 A1    Feb. 2, 2023

Related U.S. Application Data

(60) Provisional application No. 63/226,216, filed on Jul. 28, 2021.

(51) Int. Cl.
*G06F 3/06*    (2006.01)

(52) U.S. Cl.
CPC .......... *G06F 3/0655* (2013.01); *G06F 3/0644* (2013.01); *G06F 3/0679* (2013.01)

(58) Field of Classification Search
CPC .... G06F 3/0655; G06F 3/0644; G06F 3/0679; G06F 21/60; G06F 11/00–3696
See application file for complete search history.

(56) References Cited

U.S. PATENT DOCUMENTS

| | | |
|---|---|---|
| 3,668,631 A | 6/1972 | Griffith et al. |
| 3,668,632 A | 6/1972 | Oldham |
| 4,058,851 A | 11/1977 | Scheuneman |
| 4,112,502 A | 9/1978 | Scheuneman |
| 4,394,763 A | 7/1983 | Nagano et al. |
| 4,413,339 A | 11/1983 | Riggle et al. |
| 4,556,961 A | 12/1985 | Iwahashi et al. |

(Continued)

FOREIGN PATENT DOCUMENTS

| | | |
|---|---|---|
| EP | 0783754 B1 | 7/1997 |
| EP | 1434236 B1 | 6/2004 |

(Continued)

OTHER PUBLICATIONS

US 7,161,836 B1, 01/2007, Wan et al. (withdrawn)

(Continued)

*Primary Examiner* — Charles Rones
*Assistant Examiner* — Hewy H Li
(74) *Attorney, Agent, or Firm* — KLIGLER & ASSOCIATES PATENT ATTORNEYS LTD (57) ABSTRACT

An apparatus for data storage, includes circuitry and a plurality of memory cells. The circuitry is configured to store data in a group of multiple memory cells by writing multiple respective input storage values to the memory cells in the group, to read respective output storage values from the memory cells in the group after storing the data, to generate for the output storage values multiple respective confidence levels, to produce composite data that includes the output storage values, to test a predefined condition that depends on the confidence levels, upon detecting that the condition is met, to compress the confidence levels to produce compressed soft data, and include the compressed soft data in the composite data, and to transfer the composite data over an interface to a memory controller.

24 Claims, 4 Drawing Sheets

(56) References Cited

U.S. PATENT DOCUMENTS

| | | |
|---|---|---|
| 4,558,431 A | 12/1985 | Satoh |
| 4,608,687 A | 8/1986 | Dutton |
| 4,654,847 A | 3/1987 | Dutton |
| 4,661,929 A | 4/1987 | Aoki et al. |
| 4,768,171 A | 8/1988 | Tada |
| 4,811,285 A | 3/1989 | Walker et al. |
| 4,899,342 A | 2/1990 | Potter et al. |
| 4,910,706 A | 3/1990 | Hyatt |
| 4,993,029 A | 2/1991 | Galbraith et al. |
| 5,056,089 A | 10/1991 | Furuta et al. |
| 5,077,722 A | 12/1991 | Geist et al. |
| 5,126,808 A | 6/1992 | Montalvo et al. |
| 5,163,021 A | 11/1992 | Mehrotra et al. |
| 5,172,338 A | 12/1992 | Mehrotta et al. |
| 5,182,558 A | 1/1993 | Mayo |
| 5,182,752 A | 1/1993 | Deroo et al. |
| 5,191,584 A | 3/1993 | Anderson |
| 5,200,959 A | 4/1993 | Gross et al. |
| 5,237,535 A | 8/1993 | Mielke et al. |
| 5,272,669 A | 12/1993 | Samachisa et al. |
| 5,276,649 A | 1/1994 | Hoshita et al. |
| 5,287,469 A | 2/1994 | Tsuboi |
| 5,365,484 A | 11/1994 | Cleveland et al. |
| 5,388,064 A | 2/1995 | Khan |
| 5,416,646 A | 5/1995 | Shirai |
| 5,416,782 A | 5/1995 | Wells et al. |
| 5,446,854 A | 8/1995 | Khalidi et al. |
| 5,450,424 A | 9/1995 | Okugaki et al. |
| 5,469,444 A | 11/1995 | Endoh et al. |
| 5,473,753 A | 12/1995 | Wells et al. |
| 5,479,170 A | 12/1995 | Cauwenberghs et al. |
| 5,495,486 A | 2/1996 | Gheewala |
| 5,508,958 A | 4/1996 | Fazio et al. |
| 5,519,831 A | 5/1996 | Holzhammer |
| 5,532,962 A | 7/1996 | Auclair et al. |
| 5,533,190 A | 7/1996 | Binford et al. |
| 5,541,886 A | 7/1996 | Hasbun |
| 5,600,677 A | 2/1997 | Citta et al. |
| 5,638,320 A | 6/1997 | Wong et al. |
| 5,657,332 A | 8/1997 | Auclair et al. |
| 5,675,540 A | 10/1997 | Roohparvar |
| 5,682,352 A | 10/1997 | Wong et al. |
| 5,687,114 A | 11/1997 | Khan |
| 5,696,717 A | 12/1997 | Koh |
| 5,726,649 A | 3/1998 | Tamaru et al. |
| 5,726,934 A | 3/1998 | Tran et al. |
| 5,742,752 A | 4/1998 | De Koning |
| 5,748,533 A | 5/1998 | Dunlap et al. |
| 5,748,534 A | 5/1998 | Dunlap et al. |
| 5,751,637 A | 5/1998 | Chen et al. |
| 5,761,402 A | 6/1998 | Kaneda et al. |
| 5,798,966 A | 8/1998 | Keeney |
| 5,799,200 A | 8/1998 | Brant et al. |
| 5,801,985 A | 9/1998 | Roohparvar et al. |
| 5,838,832 A | 11/1998 | Barnsley |
| 5,860,106 A | 1/1999 | Domen et al. |
| 5,867,114 A | 2/1999 | Barbir |
| 5,867,428 A | 2/1999 | Ishii et al. |
| 5,867,429 A | 2/1999 | Chen et al. |
| 5,877,986 A | 3/1999 | Harari et al. |
| 5,889,937 A | 3/1999 | Tamagawa |
| 5,901,089 A | 5/1999 | Korsh et al. |
| 5,909,449 A | 6/1999 | So et al. |
| 5,912,906 A | 6/1999 | Wu et al. |
| 5,930,167 A | 7/1999 | Lee et al. |
| 5,937,424 A | 8/1999 | Leak et al. |
| 5,942,004 A | 8/1999 | Cappelletti |
| 5,946,716 A | 8/1999 | Karp et al. |
| 5,969,986 A | 10/1999 | Wong et al. |
| 5,982,668 A | 11/1999 | Ishii et al. |
| 5,991,517 A | 11/1999 | Harari et al. |
| 5,995,417 A | 11/1999 | Chen et al. |
| 6,009,014 A | 12/1999 | Hollmer et al. |
| 6,009,016 A | 12/1999 | Ishii et al. |
| 6,023,425 A | 2/2000 | Ishii et al. |
| 6,034,891 A | 3/2000 | Norman |
| 6,040,993 A | 3/2000 | Chen et al. |
| 6,041,430 A | 3/2000 | Yamauchi |
| 6,073,204 A | 6/2000 | Lakhani et al. |
| 6,101,614 A | 8/2000 | Gonzales et al. |
| 6,128,237 A | 10/2000 | Shirley et al. |
| 6,134,140 A | 10/2000 | Tanaka et al. |
| 6,134,143 A | 10/2000 | Norman |
| 6,134,631 A | 10/2000 | Jennings |
| 6,141,261 A | 10/2000 | Patti |
| 6,151,246 A | 11/2000 | So et al. |
| 6,157,573 A | 12/2000 | Ishii et al. |
| 6,166,962 A | 12/2000 | Chen et al. |
| 6,169,691 B1 | 1/2001 | Pasotti et al. |
| 6,178,466 B1 | 1/2001 | Gilbertson et al. |
| 6,185,134 B1 | 2/2001 | Tanaka et al. |
| 6,209,113 B1 | 3/2001 | Roohparvar |
| 6,212,654 B1 | 4/2001 | Lou et al. |
| 6,219,276 B1 | 4/2001 | Parker |
| 6,219,447 B1 | 4/2001 | Lee et al. |
| 6,222,762 B1 | 4/2001 | Guterman et al. |
| 6,230,233 B1 | 5/2001 | Lofgren et al. |
| 6,240,458 B1 | 5/2001 | Gilbertson |
| 6,259,627 B1 | 7/2001 | Wong |
| 6,275,419 B1 | 8/2001 | Guterman et al. |
| 6,278,632 B1 | 8/2001 | Chevallier |
| 6,279,069 B1 | 8/2001 | Robinson et al. |
| 6,288,944 B1 | 9/2001 | Kawamura |
| 6,292,394 B1 | 9/2001 | Cohen et al. |
| 6,301,151 B1 | 10/2001 | Engh et al. |
| 6,304,486 B1 | 10/2001 | Yano |
| 6,307,776 B1 | 10/2001 | So et al. |
| 6,314,044 B1 | 11/2001 | Sasaki et al. |
| 6,317,363 B1 | 11/2001 | Guterman et al. |
| 6,317,364 B1 | 11/2001 | Guterman et al. |
| 6,345,004 B1 | 2/2002 | Omura et al. |
| 6,360,346 B1 | 3/2002 | Miyauchi et al. |
| 6,363,008 B1 | 3/2002 | Wong |
| 6,363,454 B1 | 3/2002 | Lakhani et al. |
| 6,366,496 B1 | 4/2002 | Torelli et al. |
| 6,385,092 B1 | 5/2002 | Ishii et al. |
| 6,392,932 B1 | 5/2002 | Ishii et al. |
| 6,396,742 B1 | 5/2002 | Korsh et al. |
| 6,397,364 B1 | 5/2002 | Barkan |
| 6,405,323 B1 | 6/2002 | Lin et al. |
| 6,405,342 B1 | 6/2002 | Lee |
| 6,418,060 B1 | 7/2002 | Yong et al. |
| 6,442,585 B1 | 8/2002 | Dean et al. |
| 6,445,602 B1 | 9/2002 | Kokudo et al. |
| 6,452,838 B1 | 9/2002 | Ishii et al. |
| 6,456,528 B1 | 9/2002 | Chen |
| 6,466,476 B1 | 10/2002 | Wong et al. |
| 6,467,062 B1 | 10/2002 | Barkan |
| 6,469,931 B1 | 10/2002 | Ban et al. |
| 6,480,948 B1 | 11/2002 | Virajpet et al. |
| 6,490,236 B1 | 12/2002 | Fukuda et al. |
| 6,522,580 B2 | 2/2003 | Chen et al. |
| 6,525,952 B2 | 2/2003 | Araki et al. |
| 6,532,556 B1 | 3/2003 | Wong et al. |
| 6,538,922 B1 | 3/2003 | Khalid et al. |
| 6,549,464 B2 | 4/2003 | Tanaka et al. |
| 6,553,510 B1 | 4/2003 | Pekny et al. |
| 6,558,967 B1 | 5/2003 | Wong |
| 6,560,152 B1 | 5/2003 | Cernea |
| 6,567,311 B2 | 5/2003 | Ishii et al. |
| 6,577,539 B2 | 6/2003 | Iwahashi |
| 6,584,012 B2 | 6/2003 | Banks |
| 6,615,307 B1 | 9/2003 | Roohparvar |
| 6,621,739 B2 | 9/2003 | Gonzales et al. |
| 6,640,326 B1 | 10/2003 | Buckingham et al. |
| 6,643,169 B2 | 11/2003 | Rudelic et al. |
| 6,646,913 B2 | 11/2003 | Micheloni et al. |
| 6,678,192 B2 | 1/2004 | Gongwer et al. |
| 6,683,811 B2 | 1/2004 | Ishii et al. |
| 6,687,155 B2 | 2/2004 | Nagasue |
| 6,707,748 B2 | 3/2004 | Lin et al. |
| 6,708,257 B2 | 3/2004 | Bao |
| 6,714,449 B2 | 3/2004 | Khalid |
| 6,717,847 B2 | 4/2004 | Chen |

(56) References Cited

U.S. PATENT DOCUMENTS

| | | |
|---|---|---|
| 6,731,557 B2 | 5/2004 | Beretta |
| 6,732,250 B2 | 5/2004 | Durrant |
| 6,738,293 B1 | 5/2004 | Iwahashi |
| 6,751,766 B2 | 6/2004 | Guterman et al. |
| 6,757,193 B2 | 6/2004 | Chen et al. |
| 6,774,808 B1 | 8/2004 | Hibbs et al. |
| 6,781,877 B2 | 8/2004 | Cernea et al. |
| 6,804,805 B2 | 10/2004 | Rub |
| 6,807,095 B2 | 10/2004 | Chen et al. |
| 6,807,101 B2 | 10/2004 | Ooishi et al. |
| 6,809,964 B2 | 10/2004 | Moschopoulos et al. |
| 6,819,592 B2 | 11/2004 | Noguchi et al. |
| 6,829,167 B2 | 12/2004 | Tu et al. |
| 6,845,052 B1 | 1/2005 | Ho et al. |
| 6,851,018 B2 | 2/2005 | Wyatt et al. |
| 6,851,081 B2 | 2/2005 | Yamamoto |
| 6,856,546 B2 | 2/2005 | Guterman et al. |
| 6,862,218 B2 | 3/2005 | Guterman et al. |
| 6,870,767 B2 | 3/2005 | Rudelic et al. |
| 6,870,773 B2 | 3/2005 | Noguchi et al. |
| 6,873,552 B2 | 3/2005 | Ishii et al. |
| 6,879,520 B2 | 4/2005 | Hosono et al. |
| 6,882,567 B1 | 4/2005 | Wong |
| 6,894,926 B2 | 5/2005 | Guterman et al. |
| 6,907,497 B2 | 6/2005 | Hosono et al. |
| 6,925,009 B2 | 8/2005 | Noguchi et al. |
| 6,930,925 B2 | 8/2005 | Guo et al. |
| 6,934,188 B2 | 8/2005 | Roohparvar |
| 6,937,511 B2 | 8/2005 | Hsu et al. |
| 6,958,938 B2 | 10/2005 | Noguchi et al. |
| 6,963,505 B2 | 11/2005 | Cohen |
| 6,972,993 B2 | 12/2005 | Conley et al. |
| 6,988,175 B2 | 1/2006 | Lasser |
| 6,992,932 B2 | 1/2006 | Cohen |
| 6,999,344 B2 | 2/2006 | Hosono et al. |
| 7,002,843 B2 | 2/2006 | Guterman et al. |
| 7,006,379 B2 | 2/2006 | Noguchi et al. |
| 7,012,835 B2 | 3/2006 | Gonzales et al. |
| 7,020,017 B2 | 3/2006 | Chen et al. |
| 7,023,735 B2 | 4/2006 | Ban et al. |
| 7,031,210 B2 | 4/2006 | Park et al. |
| 7,031,214 B2 | 4/2006 | Tran |
| 7,031,216 B2 | 4/2006 | You |
| 7,039,846 B2 | 5/2006 | Hewitt et al. |
| 7,042,766 B1 | 5/2006 | Wang et al. |
| 7,054,193 B1 | 5/2006 | Wong |
| 7,054,199 B2 | 5/2006 | Lee et al. |
| 7,057,958 B2 | 6/2006 | So et al. |
| 7,065,147 B2 | 6/2006 | Ophir et al. |
| 7,068,539 B2 | 6/2006 | Guterman et al. |
| 7,071,849 B2 | 7/2006 | Zhang |
| 7,072,222 B2 | 7/2006 | Ishii et al. |
| 7,079,555 B2 | 7/2006 | Baydar et al. |
| 7,088,615 B2 | 8/2006 | Guterman et al. |
| 7,096,406 B2 | 8/2006 | Kanazawa et al. |
| 7,099,194 B2 | 8/2006 | Tu et al. |
| 7,102,924 B2 | 9/2006 | Chen et al. |
| 7,113,432 B2 | 9/2006 | Mokhlesi |
| 7,130,210 B2 | 10/2006 | Bathul et al. |
| 7,139,192 B1 | 11/2006 | Wong |
| 7,139,198 B2 | 11/2006 | Guterman et al. |
| 7,145,805 B2 | 12/2006 | Ishii et al. |
| 7,151,692 B2 | 12/2006 | Wu |
| 7,158,058 B1 | 1/2007 | Yu |
| 7,170,781 B2 | 1/2007 | So et al. |
| 7,170,802 B2 | 1/2007 | Cernea et al. |
| 7,173,859 B2 | 2/2007 | Hemink |
| 7,177,184 B2 | 2/2007 | Chen |
| 7,177,195 B2 | 2/2007 | Gonzales et al. |
| 7,177,199 B2 | 2/2007 | Chen et al. |
| 7,177,200 B2 | 2/2007 | Ronen et al. |
| 7,184,338 B2 | 2/2007 | Nagakawa et al. |
| 7,187,195 B2 | 3/2007 | Kim |
| 7,187,592 B2 | 3/2007 | Guterman et al. |
| 7,190,614 B2 | 3/2007 | Wu |
| 7,193,898 B2 | 3/2007 | Cernea |
| 7,193,921 B2 | 3/2007 | Choi et al. |
| 7,196,644 B1 | 3/2007 | Anderson et al. |
| 7,196,928 B2 | 3/2007 | Chen |
| 7,196,933 B2 | 3/2007 | Shibata |
| 7,197,594 B2 | 3/2007 | Raz et al. |
| 7,200,062 B2 | 4/2007 | Kinsely et al. |
| 7,210,077 B2 | 4/2007 | Brandenberger et al. |
| 7,221,592 B2 | 5/2007 | Nazarian |
| 7,224,613 B2 | 5/2007 | Chen et al. |
| 7,231,474 B1 | 6/2007 | Helms et al. |
| 7,231,562 B2 | 6/2007 | Ohlhoff et al. |
| 7,243,275 B2 | 7/2007 | Gongwer et al. |
| 7,254,690 B2 | 8/2007 | Rao |
| 7,254,763 B2 | 8/2007 | Aadsen et al. |
| 7,257,027 B2 | 8/2007 | Park |
| 7,259,987 B2 | 8/2007 | Chen et al. |
| 7,266,026 B2 | 9/2007 | Gongwer et al. |
| 7,266,069 B2 | 9/2007 | Chu |
| 7,269,066 B2 | 9/2007 | Nguyen et al. |
| 7,272,757 B2 | 9/2007 | Stocken |
| 7,274,611 B2 | 9/2007 | Roohparvar |
| 7,277,355 B2 | 10/2007 | Tanzana |
| 7,280,398 B1 | 10/2007 | Lee |
| 7,280,409 B2 | 10/2007 | Misumi et al. |
| 7,280,415 B2 | 10/2007 | Hwang et al. |
| 7,283,399 B2 | 10/2007 | Ishii et al. |
| 7,289,344 B2 | 10/2007 | Chen |
| 7,301,807 B2 | 11/2007 | Khalid et al. |
| 7,301,817 B2 | 11/2007 | Li et al. |
| 7,308,525 B2 | 12/2007 | Lasser et al. |
| 7,310,255 B2 | 12/2007 | Chan |
| 7,310,269 B2 | 12/2007 | Shibata |
| 7,310,271 B2 | 12/2007 | Lee |
| 7,310,272 B1 | 12/2007 | Mokhlesi et al. |
| 7,310,347 B2 | 12/2007 | Lasser |
| 7,312,727 B1 | 12/2007 | Feng et al. |
| 7,321,509 B2 | 1/2008 | Chen et al. |
| 7,328,384 B1 | 2/2008 | Kulkarni et al. |
| 7,342,831 B2 | 3/2008 | Mokhlesi et al. |
| 7,343,330 B1 | 3/2008 | Boesjes et al. |
| 7,345,924 B2 | 3/2008 | Nguyen et al. |
| 7,345,928 B2 | 3/2008 | Li |
| 7,349,263 B2 | 3/2008 | Kim et al. |
| 7,356,755 B2 | 4/2008 | Fackenthal |
| 7,363,420 B2 | 4/2008 | Lin et al. |
| 7,365,671 B1 | 4/2008 | Anderson |
| 7,369,434 B2 | 5/2008 | Radke |
| 7,388,781 B2 | 6/2008 | Litsyn et al. |
| 7,397,697 B2 | 7/2008 | So et al. |
| 7,405,974 B2 | 7/2008 | Yaoi et al. |
| 7,405,979 B2 | 7/2008 | Ishii et al. |
| 7,408,804 B2 | 8/2008 | Hemink et al. |
| 7,408,810 B2 | 8/2008 | Aritome et al. |
| 7,409,473 B2 | 8/2008 | Conley et al. |
| 7,409,623 B2 | 8/2008 | Baker et al. |
| 7,420,847 B2 | 9/2008 | Li |
| 7,433,231 B2 | 10/2008 | Aritome |
| 7,433,697 B2 | 10/2008 | Karaoguz et al. |
| 7,434,111 B2 | 10/2008 | Sugiura et al. |
| 7,437,498 B2 | 10/2008 | Ronen |
| 7,440,324 B2 | 10/2008 | Mokhlesi |
| 7,440,331 B2 | 10/2008 | Hemink |
| 7,441,067 B2 | 10/2008 | Gorobetz et al. |
| 7,447,970 B2 | 11/2008 | Wu et al. |
| 7,450,421 B2 | 11/2008 | Mokhlesi et al. |
| 7,453,737 B2 | 11/2008 | Ha |
| 7,457,163 B2 | 11/2008 | Hemink |
| 7,457,897 B1 | 11/2008 | Lee et al. |
| 7,460,410 B2 | 12/2008 | Nagai et al. |
| 7,460,412 B2 | 12/2008 | Lee et al. |
| 7,466,592 B2 | 12/2008 | Mitani et al. |
| 7,468,907 B2 | 12/2008 | Kang et al. |
| 7,468,911 B2 | 12/2008 | Lutze et al. |
| 7,469,049 B1 | 12/2008 | Feng |
| 7,471,581 B2 | 12/2008 | Tran et al. |
| 7,483,319 B2 | 1/2009 | Brown |
| 7,487,329 B2 | 2/2009 | Hepkin et al. |
| 7,487,394 B2 | 2/2009 | Forhan et al. |

(56) References Cited

U.S. PATENT DOCUMENTS

| | | |
|---|---|---|
| 7,492,641 B2 | 2/2009 | Hosono et al. |
| 7,508,710 B2 | 3/2009 | Mokhlesi |
| 7,526,711 B2 | 4/2009 | Orio |
| 7,539,061 B2 | 5/2009 | Lee |
| 7,539,062 B2 | 5/2009 | Doyle |
| 7,551,492 B2 | 6/2009 | Kim |
| 7,558,109 B2 | 7/2009 | Brandman et al. |
| 7,558,839 B1 | 7/2009 | McGovern |
| 7,568,135 B2 | 7/2009 | Cornwell et al. |
| 7,570,520 B2 | 8/2009 | Kamei et al. |
| 7,574,555 B2 | 8/2009 | Porat et al. |
| 7,590,002 B2 | 9/2009 | Mokhlesi et al. |
| 7,593,259 B2 | 9/2009 | Kim et al. |
| 7,594,093 B1 | 9/2009 | Kancherla |
| 7,596,707 B1 | 9/2009 | Vemula |
| 7,609,787 B2 | 10/2009 | Jahan et al. |
| 7,613,043 B2 | 11/2009 | Cornwell et al. |
| 7,616,498 B2 | 11/2009 | Mokhlesi et al. |
| 7,619,918 B2 | 11/2009 | Aritome |
| 7,631,245 B2 | 12/2009 | Lasser |
| 7,633,798 B2 | 12/2009 | Sarin et al. |
| 7,633,802 B2 | 12/2009 | Mokhlesi |
| 7,639,532 B2 | 12/2009 | Roohparvar et al. |
| 7,644,347 B2 | 1/2010 | Alexander et al. |
| 7,656,734 B2 | 2/2010 | Thorp et al. |
| 7,660,158 B2 | 2/2010 | Aritome |
| 7,660,183 B2 | 2/2010 | Ware et al. |
| 7,661,000 B2 | 2/2010 | Ueda et al. |
| 7,661,054 B2 | 2/2010 | Huffman et al. |
| 7,665,007 B2 | 2/2010 | Yang et al. |
| 7,680,987 B1 | 3/2010 | Clark et al. |
| 7,733,712 B1 | 6/2010 | Walston et al. |
| 7,742,351 B2 | 6/2010 | Inoue et al. |
| 7,761,624 B2 | 7/2010 | Karamcheti et al. |
| 7,797,609 B2 | 9/2010 | Neuman |
| 7,810,017 B2 | 10/2010 | Radke |
| 7,848,149 B2 | 12/2010 | Gonzales et al. |
| 7,869,273 B2 | 1/2011 | Lee et al. |
| 7,885,119 B2 | 2/2011 | Li |
| 7,904,783 B2 | 3/2011 | Brandman et al. |
| 7,925,936 B1 | 4/2011 | Sommer |
| 7,928,497 B2 | 4/2011 | Yaegashi |
| 7,929,549 B1 | 4/2011 | Talbot |
| 7,930,515 B2 | 4/2011 | Gupta et al. |
| 7,945,825 B2 | 5/2011 | Cohen et al. |
| 7,978,516 B2 | 7/2011 | Olbrich et al. |
| 7,995,388 B1 | 8/2011 | Winter et al. |
| 8,000,141 B1 | 8/2011 | Shalvi et al. |
| 8,014,094 B1 | 9/2011 | Jin |
| 8,037,380 B2 | 10/2011 | Cagno et al. |
| 8,040,744 B2 | 10/2011 | Gorobets et al. |
| 8,059,457 B2 | 11/2011 | Perlmutter et al. |
| 8,065,583 B2 | 11/2011 | Radke |
| 8,230,300 B2 | 7/2012 | Perlmutter et al. |
| 8,239,747 B2 | 8/2012 | Cho et al. |
| 8,374,014 B2 | 2/2013 | Rotbard et al. |
| 8,400,858 B2 | 3/2013 | Meir et al. |
| 8,429,493 B2 | 4/2013 | Sokolov et al. |
| 8,479,080 B1 | 7/2013 | Shalvi et al. |
| 8,493,781 B1 | 7/2013 | Meir et al. |
| 8,493,783 B2 | 7/2013 | Meir et al. |
| 8,495,465 B1 | 7/2013 | Anholt et al. |
| 8,570,804 B2 | 10/2013 | Shalvi et al. |
| 8,572,311 B1 | 10/2013 | Shalvi et al. |
| 8,572,423 B1 | 10/2013 | Isachar et al. |
| 8,599,611 B2 | 12/2013 | Shalvi et al. |
| 8,645,794 B1 | 2/2014 | Meir et al. |
| 8,677,054 B1 | 3/2014 | Meir et al. |
| 8,677,203 B1 | 3/2014 | Shalvi et al. |
| 8,694,814 B1 | 4/2014 | Salomon et al. |
| 8,694,853 B1 | 4/2014 | Sommer |
| 8,694,854 B1 | 4/2014 | Dar et al. |
| 8,767,459 B1 | 7/2014 | Kasorla et al. |
| 8,886,990 B2 | 11/2014 | Meir et al. |
| 8,990,665 B1 | 3/2015 | Steiner et al. |
| 8,996,793 B1 | 3/2015 | Steiner et al. |
| 9,021,181 B1 | 4/2015 | Rotbard et al. |
| 9,032,263 B2 | 5/2015 | Yang |
| 9,104,580 B1 | 8/2015 | Meir |
| 9,214,965 B2 | 12/2015 | Fitzpatrick et al. |
| 9,229,861 B2 | 1/2016 | Perlmutter et al. |
| 9,454,414 B2 | 9/2016 | Micheloni et al. |
| 9,671,972 B2 | 6/2017 | Perlmutter et al. |
| 9,672,942 B2 | 6/2017 | Yoon et al. |
| 9,912,353 B1 | 3/2018 | Low |
| 9,985,651 B2 | 5/2018 | Varanasi et al. |
| 10,157,013 B2 | 12/2018 | Perlmutter et al. |
| 10,474,525 B2 | 11/2019 | Sharon et al. |
| 10,847,241 B2 | 11/2020 | Yassine |
| 10,872,013 B2 | 12/2020 | Symons et al. |
| 11,032,031 B2 | 6/2021 | Jiang et al. |
| 11,450,400 B2 | 9/2022 | Yun et al. |
| 2001/0002172 A1 | 5/2001 | Tanaka et al. |
| 2001/0006479 A1 | 7/2001 | Ikehashi et al. |
| 2002/0038440 A1 | 3/2002 | Barkan |
| 2002/0056064 A1 | 5/2002 | Kidorf et al. |
| 2002/0083085 A1* | 6/2002 | Davis ............. G06F 11/1464 |
| 2002/0118574 A1 | 8/2002 | Gongwer et al. |
| 2002/0133684 A1 | 9/2002 | Anderson |
| 2002/0166091 A1 | 11/2002 | Kidorf et al. |
| 2002/0174295 A1 | 11/2002 | Ulrich et al. |
| 2002/0196510 A1 | 12/2002 | Hietala et al. |
| 2003/0002348 A1 | 1/2003 | Chen et al. |
| 2003/0103400 A1 | 6/2003 | Van Tran |
| 2003/0161183 A1 | 8/2003 | Van Tran |
| 2003/0189856 A1 | 10/2003 | Cho et al. |
| 2004/0057265 A1 | 3/2004 | Mirabel et al. |
| 2004/0057285 A1 | 3/2004 | Cernea et al. |
| 2004/0083333 A1 | 4/2004 | Chang et al. |
| 2004/0083334 A1 | 4/2004 | Chang et al. |
| 2004/0105311 A1 | 6/2004 | Cernea et al. |
| 2004/0114437 A1 | 6/2004 | Li |
| 2004/0160842 A1 | 8/2004 | Fukiage |
| 2004/0223371 A1 | 11/2004 | Roohparvar |
| 2005/0007802 A1 | 1/2005 | Gerpheide |
| 2005/0013165 A1 | 1/2005 | Ban |
| 2005/0024941 A1 | 2/2005 | Lasser et al. |
| 2005/0024978 A1 | 2/2005 | Ronen |
| 2005/0030788 A1 | 2/2005 | Parkinson et al. |
| 2005/0086574 A1 | 4/2005 | Fackenthal |
| 2005/0121436 A1 | 6/2005 | Kamitani et al. |
| 2005/0144361 A1 | 6/2005 | Gonzalez et al. |
| 2005/0157555 A1 | 7/2005 | Ono et al. |
| 2005/0162913 A1 | 7/2005 | Chen |
| 2005/0169051 A1 | 8/2005 | Khalid et al. |
| 2005/0189649 A1 | 9/2005 | Maruyama et al. |
| 2005/0213393 A1 | 9/2005 | Lasser |
| 2005/0224853 A1 | 10/2005 | Ohkawa |
| 2005/0240745 A1 | 10/2005 | Iyer et al. |
| 2005/0243626 A1 | 11/2005 | Ronen |
| 2006/0004952 A1 | 1/2006 | Lasser |
| 2006/0028875 A1 | 2/2006 | Avraham et al. |
| 2006/0028877 A1 | 2/2006 | Meir |
| 2006/0101193 A1 | 5/2006 | Murin |
| 2006/0106972 A1 | 5/2006 | Gorobets et al. |
| 2006/0107136 A1 | 5/2006 | Gongwer et al. |
| 2006/0129750 A1 | 6/2006 | Lee et al. |
| 2006/0133141 A1 | 6/2006 | Gorobets |
| 2006/0156189 A1 | 7/2006 | Tomlin |
| 2006/0179334 A1 | 8/2006 | Brittain et al. |
| 2006/0190699 A1 | 8/2006 | Lee |
| 2006/0203546 A1 | 9/2006 | Lasser |
| 2006/0218359 A1 | 9/2006 | Sanders et al. |
| 2006/0221692 A1 | 10/2006 | Chen |
| 2006/0221705 A1 | 10/2006 | Hemink et al. |
| 2006/0221714 A1 | 10/2006 | Li et al. |
| 2006/0239077 A1 | 10/2006 | Park et al. |
| 2006/0239081 A1 | 10/2006 | Roohparvar |
| 2006/0256620 A1 | 11/2006 | Nguyen et al. |
| 2006/0256626 A1 | 11/2006 | Werner et al. |
| 2006/0256891 A1 | 11/2006 | Yuan et al. |
| 2006/0271748 A1 | 11/2006 | Jain et al. |
| 2006/0285392 A1 | 12/2006 | Incarnati et al. |
| 2006/0285396 A1 | 12/2006 | Ha |

(56) References Cited

U.S. PATENT DOCUMENTS

| | | |
|---|---|---|
| 2007/0006013 A1 | 1/2007 | Moshayedi et al. |
| 2007/0019481 A1 | 1/2007 | Park |
| 2007/0033581 A1 | 2/2007 | Tomlin et al. |
| 2007/0047314 A1 | 3/2007 | Goda et al. |
| 2007/0047326 A1 | 3/2007 | Nguyen et al. |
| 2007/0050536 A1 | 3/2007 | Kolokowsky |
| 2007/0058446 A1 | 3/2007 | Hwang et al. |
| 2007/0061502 A1 | 3/2007 | Lasser et al. |
| 2007/0067667 A1 | 3/2007 | Ikeuchi et al. |
| 2007/0074093 A1 | 3/2007 | Lasser |
| 2007/0086239 A1 | 4/2007 | Litsyn et al. |
| 2007/0086260 A1 | 4/2007 | Sinclair |
| 2007/0089034 A1 | 4/2007 | Litsyn et al. |
| 2007/0091677 A1 | 4/2007 | Lasser et al. |
| 2007/0091694 A1 | 4/2007 | Lee et al. |
| 2007/0103978 A1 | 5/2007 | Conley et al. |
| 2007/0103986 A1 | 5/2007 | Chen |
| 2007/0104211 A1 | 5/2007 | Opsasnick |
| 2007/0109845 A1 | 5/2007 | Chen |
| 2007/0109849 A1 | 5/2007 | Chen |
| 2007/0115726 A1 | 5/2007 | Cohen et al. |
| 2007/0118713 A1 | 5/2007 | Guterman et al. |
| 2007/0143378 A1 | 6/2007 | Gorobetz |
| 2007/0143531 A1 | 6/2007 | Atri |
| 2007/0159889 A1 | 7/2007 | Kang et al. |
| 2007/0159892 A1 | 7/2007 | Kang et al. |
| 2007/0159907 A1 | 7/2007 | Kwak |
| 2007/0168837 A1 | 7/2007 | Murin |
| 2007/0171714 A1 | 7/2007 | Wu et al. |
| 2007/0183210 A1 | 8/2007 | Choi et al. |
| 2007/0189073 A1 | 8/2007 | Aritome |
| 2007/0195602 A1 | 8/2007 | Fong et al. |
| 2007/0206426 A1 | 9/2007 | Mokhlesi |
| 2007/0208904 A1 | 9/2007 | Hsieh et al. |
| 2007/0226599 A1 | 9/2007 | Motwani |
| 2007/0236990 A1 | 10/2007 | Aritome |
| 2007/0253249 A1 | 11/2007 | Kang et al. |
| 2007/0256620 A1 | 11/2007 | Viggiano et al. |
| 2007/0263455 A1 | 11/2007 | Cornwell et al. |
| 2007/0266232 A1 | 11/2007 | Rodgers et al. |
| 2007/0271424 A1 | 11/2007 | Lee et al. |
| 2007/0280000 A1 | 12/2007 | Fujiu et al. |
| 2007/0291571 A1 | 12/2007 | Balasundaram |
| 2007/0297234 A1 | 12/2007 | Cernea et al. |
| 2008/0010395 A1 | 1/2008 | Mylly et al. |
| 2008/0025121 A1 | 1/2008 | Tanzawa |
| 2008/0043535 A1 | 2/2008 | Roohparvar |
| 2008/0049504 A1 | 2/2008 | Kasahara et al. |
| 2008/0049506 A1 | 2/2008 | Guterman |
| 2008/0052446 A1 | 2/2008 | Lasser et al. |
| 2008/0055993 A1 | 3/2008 | Lee |
| 2008/0080243 A1 | 4/2008 | Edahiro et al. |
| 2008/0082730 A1 | 4/2008 | Kim et al. |
| 2008/0086631 A1 | 4/2008 | Chow et al. |
| 2008/0089123 A1 | 4/2008 | Chae et al. |
| 2008/0104309 A1 | 5/2008 | Cheon et al. |
| 2008/0104312 A1 | 5/2008 | Lasser |
| 2008/0109590 A1 | 5/2008 | Jung et al. |
| 2008/0115017 A1 | 5/2008 | Jacobson |
| 2008/0123420 A1 | 5/2008 | Brandman et al. |
| 2008/0123426 A1 | 5/2008 | Lutze et al. |
| 2008/0126686 A1 | 5/2008 | Sokolov et al. |
| 2008/0130341 A1 | 6/2008 | Shalvi et al. |
| 2008/0148115 A1 | 6/2008 | Sokolov et al. |
| 2008/0151618 A1 | 6/2008 | Sharon et al. |
| 2008/0151667 A1 | 6/2008 | Miu et al. |
| 2008/0158958 A1 | 7/2008 | Sokolov et al. |
| 2008/0181001 A1 | 7/2008 | Shalvi |
| 2008/0198650 A1 | 8/2008 | Shalvi et al. |
| 2008/0198654 A1 | 8/2008 | Toda |
| 2008/0209116 A1 | 8/2008 | Caulkins |
| 2008/0209304 A1 | 8/2008 | Winarski et al. |
| 2008/0215798 A1 | 9/2008 | Sharon et al. |
| 2008/0219050 A1 | 9/2008 | Shalvi et al. |
| 2008/0239093 A1 | 10/2008 | Easwar et al. |
| 2008/0239812 A1 | 10/2008 | Abiko et al. |
| 2008/0253188 A1 | 10/2008 | Aritome |
| 2008/0263262 A1 | 10/2008 | Sokolov et al. |
| 2008/0263676 A1 | 10/2008 | Mo et al. |
| 2008/0270730 A1 | 10/2008 | Lasser et al. |
| 2008/0282106 A1 | 11/2008 | Shalvi et al. |
| 2008/0288714 A1 | 11/2008 | Salomon et al. |
| 2009/0013233 A1 | 1/2009 | Radke |
| 2009/0024905 A1 | 1/2009 | Shalvi et al. |
| 2009/0034337 A1 | 2/2009 | Aritome |
| 2009/0043831 A1 | 2/2009 | Antonopoulos et al. |
| 2009/0043951 A1 | 2/2009 | Shalvi et al. |
| 2009/0049234 A1 | 2/2009 | Oh et al. |
| 2009/0073762 A1 | 3/2009 | Lee et al. |
| 2009/0086542 A1 | 4/2009 | Lee et al. |
| 2009/0089484 A1 | 4/2009 | Chu |
| 2009/0091979 A1 | 4/2009 | Shalvi |
| 2009/0094930 A1 | 4/2009 | Schwoerer |
| 2009/0106485 A1 | 4/2009 | Anholt |
| 2009/0112949 A1 | 4/2009 | Ergan et al. |
| 2009/0132755 A1 | 5/2009 | Radke |
| 2009/0144600 A1 | 6/2009 | Perlmutter et al. |
| 2009/0150894 A1 | 6/2009 | Huang et al. |
| 2009/0157950 A1 | 6/2009 | Selinger |
| 2009/0157964 A1 | 6/2009 | Kasorla et al. |
| 2009/0158126 A1 | 6/2009 | Perlmutter et al. |
| 2009/0168524 A1 | 7/2009 | Golov et al. |
| 2009/0172257 A1 | 7/2009 | Prins et al. |
| 2009/0172261 A1 | 7/2009 | Prins et al. |
| 2009/0193184 A1 | 7/2009 | Yu et al. |
| 2009/0199074 A1 | 8/2009 | Sommer et al. |
| 2009/0204824 A1 | 8/2009 | Lin et al. |
| 2009/0204872 A1 | 8/2009 | Yu et al. |
| 2009/0213653 A1 | 8/2009 | Perlmutter et al. |
| 2009/0213654 A1 | 8/2009 | Perlmutter et al. |
| 2009/0225595 A1 | 9/2009 | Kim |
| 2009/0228761 A1* | 9/2009 | Perlmutter ............ G06F 3/0604 714/763 |
| 2009/0265509 A1 | 10/2009 | Klein |
| 2009/0300227 A1 | 12/2009 | Nochimowski et al. |
| 2009/0323412 A1 | 12/2009 | Mokhlesi et al. |
| 2009/0327608 A1 | 12/2009 | Eschmann |
| 2010/0017650 A1 | 1/2010 | Chin et al. |
| 2010/0034022 A1 | 2/2010 | Dutta et al. |
| 2010/0057976 A1 | 3/2010 | Lasser |
| 2010/0061151 A1 | 3/2010 | Miwa et al. |
| 2010/0082883 A1 | 4/2010 | Chen et al. |
| 2010/0083247 A1 | 4/2010 | Kanevsky et al. |
| 2010/0110580 A1 | 5/2010 | Takashima |
| 2010/0131697 A1 | 5/2010 | Alrod et al. |
| 2010/0137167 A1 | 6/2010 | Hellsten et al. |
| 2010/0142268 A1 | 6/2010 | Aritome |
| 2010/0142277 A1 | 6/2010 | Yang et al. |
| 2010/0169547 A1 | 7/2010 | Ou |
| 2010/0169743 A1 | 7/2010 | Vogan et al. |
| 2010/0174847 A1 | 7/2010 | Paley et al. |
| 2010/0211803 A1 | 8/2010 | Lablans |
| 2010/0287217 A1 | 11/2010 | Borchers et al. |
| 2011/0010489 A1 | 1/2011 | Yeh |
| 2011/0060969 A1 | 3/2011 | Ramamoorthy et al. |
| 2011/0066793 A1 | 3/2011 | Burd |
| 2011/0075482 A1 | 3/2011 | Shepard et al. |
| 2011/0107049 A1 | 5/2011 | Kwon et al. |
| 2011/0149657 A1 | 6/2011 | Haratsch et al. |
| 2011/0199823 A1 | 8/2011 | Bar-Or et al. |
| 2011/0302354 A1 | 12/2011 | Miller |
| 2012/0297116 A1 | 11/2012 | Gurgi et al. |
| 2014/0237315 A1* | 8/2014 | Fitzpatrick ........ H03M 13/2909 714/755 |
| 2014/0237318 A1* | 8/2014 | Fitzpatrick ......... H03M 13/1102 714/763 |
| 2015/0149840 A1 | 5/2015 | Alhussien et al. |
| 2015/0205664 A1 | 7/2015 | Janik et al. |
| 2016/0163382 A1* | 6/2016 | Conley .............. G11C 16/3459 365/185.03 |
| 2017/0046220 A1* | 2/2017 | Sharon .................. G06F 3/0679 |

(56) References Cited

U.S. PATENT DOCUMENTS

| | | | |
|---|---|---|---|
| 2017/0185299 | A1 | 6/2017 | Conley et al. |
| 2022/0164143 | A1* | 5/2022 | Kim .................. H03M 7/6041 |

FOREIGN PATENT DOCUMENTS

| | | | |
|---|---|---|---|
| EP | 1605509 | A1 | 12/2005 |
| WO | 199610256 | A1 | 4/1996 |
| WO | 1998028745 | A1 | 7/1998 |
| WO | 2002100112 | A1 | 12/2002 |
| WO | 2003100791 | A1 | 12/2003 |
| WO | 2007046084 | A2 | 4/2007 |
| WO | 2007132452 | A2 | 11/2007 |
| WO | 2007132453 | A2 | 11/2007 |
| WO | 2007132456 | A2 | 11/2007 |
| WO | 2007132457 | A2 | 11/2007 |
| WO | 2007132458 | A2 | 11/2007 |
| WO | 2007146010 | A2 | 12/2007 |
| WO | 2008026203 | A2 | 3/2008 |
| WO | 2008053472 | A2 | 5/2008 |
| WO | 2008053473 | A2 | 5/2008 |
| WO | 2008068747 | A2 | 6/2008 |
| WO | 2008077284 | A1 | 7/2008 |
| WO | 2008083131 | A2 | 7/2008 |
| WO | 2008099958 | A1 | 8/2008 |
| WO | 2008111058 | A2 | 9/2008 |
| WO | 2008124760 | A2 | 10/2008 |
| WO | 2008139441 | A2 | 11/2008 |
| WO | 2009037691 | A2 | 3/2009 |
| WO | 2009037697 | A2 | 3/2009 |
| WO | 2009038961 | A2 | 3/2009 |
| WO | 2009050703 | A2 | 4/2009 |
| WO | 2009053961 | A2 | 4/2009 |
| WO | 2009053962 | A2 | 4/2009 |
| WO | 2009053963 | A2 | 4/2009 |
| WO | 2009063450 | A2 | 5/2009 |
| WO | 2009072100 | A2 | 6/2009 |
| WO | 2009072101 | A2 | 6/2009 |
| WO | 2009072102 | A2 | 6/2009 |
| WO | 2009072103 | A2 | 6/2009 |
| WO | 2009072104 | A2 | 6/2009 |
| WO | 2009072105 | A2 | 6/2009 |
| WO | 2009074978 | A2 | 6/2009 |
| WO | 2009074979 | A2 | 6/2009 |
| WO | 2009078006 | A2 | 6/2009 |
| WO | 2009095902 | A2 | 8/2009 |
| WO | 2011024015 | A1 | 3/2011 |

OTHER PUBLICATIONS

Wei, "Trellis-Coded Modulation With Multidimensional Constellations", IEEE Transactions on Information Theory, vol. IT-33, No. 4, pp. 483-501, Jul. 1987.
Conway et al., "Sphere Packings, Lattices and Groups", Springer-Verlag, New York, Inc., USA, 3rd edition, chapter 4, pp. 94-135, year 1998.
Ankolekar et al., "Multibit Error-Correction Methods for Latency-Constrained Flash Memory Systems", IEEE Transactions on Device and Materials Reliability, vol. 10, No. 1, pp. 33-39, Mar. 2010.
Berman et al., "Mitigating Inter-Cell Coupling Effects in MLC NAND Flash via Constrained Coding", Presentation, Flash Memory Summit, Santa Clara, USA, pp. 1-21, Aug. 19, 2010.
Agrell et al., "Closest Point Search in Lattices," IEEE Transactions on Information Theory, vol. 48, No. 8, pp. 2201-2214, Aug. 2002.
Bez et al., "Introduction to Flash Memory," Proceedings of the IEEE, vol. 91, No. 4, pp. 489-502, Apr. 2003.
Blahut, "Theory and Practice of Error Control Codes," Addison-Wesley, section 3.2, pp. 47-48, May 1984.
Chang, "Hybrid Solid State Disks: Combining Heterogeneous NAND Flash in Large SSDs," Presentation, ASPDAC, pp. 1-26, Jan. 2008.
Cho et al., "A 3.3V 1Gb Multi-Level NAND Flash Memory with Non-Uniform Threshold Voltage Distribution," IEEE International Solid-State Circuits Conference (ISSCC), pp. 28-29 and 424, Feb. 2001.

"Databahn TM Flash Memory Controller IP," Denali Software, Inc., pp. 1-1, year 1994, as downloaded from https://denali.com/en/products/databahn_flash.jsp.
"FlashFX Pro TM 3.1—High Performance Flash Manager for Rapid Development of Reliable Products," product information, Datalight, Inc., pp. 1-2, Nov. 16, 2006.
Duann, "SLC & MLC Hybrid," Silicon Motion, Inc., Presentation, Flash Memory Summit, Santa Clara, USA, pp. 1-18, Aug. 2008.
Eitan et al., "Can NROM, a 2-bit, Trapping Storage NVM Cell, Give a Real Challenge to Floating Gate Cells?", Proceedings of the 1999 International Conference on Solid State Devices and Materials (SSDM), pp. 522-524, year 1999.
Eitan et al., "Multilevel Flash Cells and their Trade-offs," Proceedings of the 1996 IEEE International Electron Devices Meeting (IEDM), pp. 169-172, year 1996.
Engh et al., "A Self Adaptive Programming Method with 5 mV Accuracy for Multi-Level Storage in FLASH," Proceedings of the IEEE 2002 Custom Integrated Circuits Conference, pp. 115-118, May 2002.
Goodman et al., "On-Chip ECC for Multi-Level Random Access Memories," Proceedings of the IEEE/CAM Information Theory Workshop, pp. 1-1, Jun. 1989.
Han et al., "An Intelligent Garbage Collection Algorithm for Flash Memory Storages," Proceedings of the Conference on Computational Science and its Applications—ICCSA 2006, Springer-Verlag Berlin Heidelberg, vol. 3980/2006, pp. 1019-1027, May 2006.
Han et al., "CATA: A Garbage Collection Scheme for Flash Memory File Systems," Ubiquitous Intelligence and Computing, Springer-Verlag Berlin Heidelberg, vol. 4159/2006, pp. 103-112, Aug. 2006.
Horstein, "On the Design of Signals for Sequential and Nonsequential Detection System with Feedback," IEEE Transactions on Information Theory, vol. IT-12, No. 4, pp. 448-455, Oct. 1966.
Jung et al., "A 117-mm2 3.3-V Only 128-Mb Multilevel NAND Flash Memory for Mass Storage Applications," IEEE Journal of Solid-State Circuits, vol. 31, No. 11, pp. 1575-1583, Nov. 1996.
Kawaguchi et al., "A Flash-Memory Based File System," Proceedings of the USENIX 1995 Technical Conference, pp. 155-164, year 1995 XXXXDocument attached is not identical with the document cited. Actual page numbers are 1-10XXXXX.
Kim et al., "Future Memory Technology Including Emerging New Memories," Proceedings of the 24th International Conference on Microelectronics (MIEL2004), volue 1, pp. 377-384, May 2004.
Lee et al., "Effects of Floating-Gate Interference on NAND Flash Memory Cell Operation," IEEE Electron Device etters, vol. 23, No. 5, pp. 264-266, May 2002.
Maayan et al., "A 512 Mb NROM Flash Data Storage Memory with 8 MB/s Data Rate," Proceedings of the 2002 IEEE International Solid-State Circuits Conference (ISSCC 2002), pp. 100-101, Feb. 2002.
Mielke et al., Recovery Effects in the Distributed Cycling of Flash Memories, Proceedings of the IEEE 44th Annual International Reliability Physics Symposium, pp. 29-35, Mar. 2006.
"ONFI—Open NAND Flash Interface Specification," revision 1.0, pp. 1-106, Dec. 2006.
"PS8000 Controller Specification (for SD Card)," Phison Electronics Corporation, revision 1.2, document No. S-07018, pp. 1-20, Mar. 2007.
Shalvi et al., "Signal Codes," Proceedings of the 2003 IEEE Information Theory Workshop (ITW2003), pp. 1-18, Apr. 2003.
Shiozaki, "Adaptive Type-II Hybrid Broadcast ARQ System," IEEE Transactions on Communications, vol. 44, No. 4, pp. 420-422, Apr. 1996.
Suh et al., "A 3.3 V 32 Mb NAND Flash Memory with Incremental Step Pulse Programming Scheme," IEEE Journal of Solid-State Circuits, vol. 30, No. 11, pp. 1149-1156, Nov. 1995.
"Bad Block Management in NAND Flash Memories," STMicroelectronics, Application Note AN1819, pp. 1-7, May 2004.
"Wear Leveling in Single Level Cell NAND Flash Memories," STMicroelectronics, Application Note AN1822, pp. 1-7, Feb. 2007.
Takeuchi et al., "A Double-Level-Vth Select Gate Array Architecture for Multi-Level NAND Flash Memories," Digest of Technical Papers, 1995 Symposium on VLSI Circuits, pp. 69-70, Jun. 1995.

(56) References Cited

OTHER PUBLICATIONS

Wu et al., "eNVy: A Non-Volatile, Main Memory Storage System," Proceedings of the 6th International Conference on Architectural Support for Programming Languages and Operating Systems, pp. 86-97, year 1994.

Kim et al., "Multi-bit Error Tolerant Caches Using Two-Dimensional Error Coding", Proceedings of the 40th Annual ACM/IEEE International Symposium on Microarchitecture (MICRO-40), Chicago, USA, pp. 197-209, Dec. 2007.

Budilovsky et al., "Prototyping a High-Performance Low-Cost Solid-State Disk", SYSTOR—The 4th Annual International Systems and Storage Conference, Haifa, Israel, pp. 1-11, year 2011.

NVM Express Protocol, "NVM Express", Revision 1.2a, pp. 1-209, Oct. 23, 2015.

SCSI Protocol, "Information Technology—SCSI Architecture Model—5 (SAM-5)", INCITS project T10/2104-D, revision 01, pp. 1-150, Jan. 28, 2009.

SAS Protocol, "Information Technology—Serial Attached SCSI—2 (SAS-2)", Incits project T10/1760-D, revision 15a, pp. 1-921, Feb. 22, 2009.

Takeuchi et al., "A Multipage Cell Architecture for High-Speed Programming Multilevel NAND Flash Memories", IEEE Journal of Solid-State Circuits, vol. 33, No. 8, pp. 1228-1237, Aug. 1998.

Jedec Standard JESD84-C44, "Embedded MultiMediaCard (e•MMC) Mechanical Standard, with Optional Reset Signal", Jedec Solid State Technology Association, USA, pp. 1-13, Jul. 2009.

Jedec, "UFS Specification—Version 0.1," pp. 1-94, Nov. 11, 2009.

SD Group, Technical Committee SD Card Association, "SD Specifications Part 1—Physical Layer Specification, Version 3.01, draft 1.00," pp. 1-220, Nov. 9, 2009.

"Universal Serial Bus Specification", revision 2.0, Compaq, Hewlett, Intel, Lucent, Microsoft etc., pp. 1-650, Apr. 27, 2000.

Serial ATA International Organization, "Serial ATA Revision 3.0 Specification", pp. 1-663, Jun. 2, 2009.

Gotou, "An Experimental Confirmation of Automatic Threshold Voltage Convergence in a Flash Memory Using Alternating Word-Line Voltage Pulses", IEEE Electron Device Letters, vol. 18, No. 10, pp. 503-505, Oct. 1997.

Huffman, "Non-Volatile Memory Host Controller Interface (NVMHCI)", Specification 1.0, pp. 1-65, Apr. 14, 2008.

Panchbhai et al., "Improving Reliability of NAND Based Flash Memory Using Hybrid SLC/MLC Device—Project Proposal for CSci 8980—Advanced Storage Systems," Department of Computer Science, University of Minnesota, USA, pp. 1-4, Mar. 2009.

"M25PE16: 16-Mbit, page-erasable serial flash memory with byte-alterability, 75 MHz SPI bus, standard pinout", Numonyx B.V., pp. 1-58, Apr. 2008.

Hong et al., "NAND Flash-based Disk Cache Using SLC/MLC Combined Flash Memory", 2010 International Workshop on Storage Network Architecture and Parallel I/Os, pp. 21-30, USA, May 3, 2010.

Engineering Windows 7, "Support and Q&A for Solid-State Drives", e7blog, pp. 1-10, May 5, 2009.

"Memory Management in NAND Flash Arrays", Technical Note 29-28, Micron Technology Inc., pp. 1-10, year 2005.

Kang et al., "A Superblock-based Flash Translation Layer for NAND Flash Memory", Proceedings of the 6th ACM & IEEE International Conference on Embedded Software, Seoul, Korea, pp. 161-170, Oct. 2006.

Park et al., "Sub-Grouped Superblock Management for High-Performance Flash Storages", IEICE Electronics Express, vol. 6, No. 6, pp. 297-303, Mar. 25, 2009.

"How to Resolve "Bad Super Block: Magic Number Wrong" in BSD", Free Online Articles Director Article Base, pp. 1-3, posted Sep. 5, 2009.

"Memory Stick Failed IO Superblock", UBUNTU Forums, pp. 1-2, posted Nov. 11, 2009.

"SD Card Failure, can't read superblock", Super User Forums, pp. 1-2, posted Aug. 8, 2010.

* cited by examiner

EFFICIENT TRANSFER OF HARD DATA AND CONFIDENCE LEVELS IN READING A NONVOLATILE MEMORY

CROSS-REFERENCE TO RELATED APPLICATIONS

This application claims the benefit of U.S. Provisional Patent Application 63/226,216, filed Jul. 28, 2021, whose disclosure is incorporated herein by reference.

TECHNICAL FIELD

Embodiments described herein relate generally to data storage, and particularly to methods and systems for efficient transfer of hard data and confidence levels in reading a nonvolatile memory.

BACKGROUND

In various storage systems, a memory controller applies soft decoding to encoded data retrieved from a memory device. To this end, the memory device transmits to the memory controller hard bits read from the memory and confidence levels associated respectively with the hard bits.

Methods for transferring hard data and corresponding confidence levels are known in the art. For example, U.S. Pat. No. 9,671,972 describes a method for data storage that includes storing data in a group of analog memory cells by writing respective input storage values to the memory cells in the group. After storing the data, respective output storage values are read from the analog memory cells in the group. Respective confidence levels of the output storage values are estimated, and the confidence levels are compressed. The output storage values and the compressed confidence levels are transferred from the memory cells over an interface to a memory controller.

U.S. Pat. No. 9,214,965 describes a method for improving data integrity in a non-volatile memory system, the method includes: accessing a non-volatile memory cell for retrieving hard data bits; generating soft information by capturing a reliability of the hard data bits; calculating syndrome bits by applying a lossy compression to the soft information; and generating a host data by executing a low density parity check (LDPC) iterative decode on the hard data bits and the syndrome bits.

SUMMARY

An embodiment that is described herein provides an apparatus for data storage that includes circuitry and a plurality of memory cells. The circuitry is configured to store data in a group of multiple memory cells by writing multiple respective input storage values to the memory cells in the group, to read respective output storage values from the memory cells in the group after storing the data, to generate for the output storage values multiple respective confidence levels, to produce composite data that includes the output storage values, to test a predefined condition that depends on the confidence levels, upon detecting that the condition is met, to compress the confidence levels to produce compressed soft data, and include the compressed soft data in the composite data, and to transfer the composite data over an interface to a memory controller.

In some embodiments, the circuitry is configured to detect that the condition is met based on a number of confidence levels among the multiple confidence levels having a selected confidence level value. In other embodiments, the circuitry is configured to detect that the condition is met in response to identifying that at least one of the confidence levels is indicative of a low level of confidence compared to another of the confidence levels. In yet other embodiments, the circuitry is configured to produce the compressed soft data independently of the output storage values.

In an embodiment, the circuitry is configured to produce the compressed soft data dependently on the output storage values. In another embodiment, the circuitry is configured to determine an index of a confidence level having a selected confidence value, to calculate a count of the output storage values having a selected storage value in a range of indices below the index, and to include in the compressed soft data a binary representation of the calculated count. In yet another embodiment, the circuitry is configured to determine an index of a confidence level having a selected confidence value, and to include in the composite data a binary representation of the index.

In some embodiments, the circuitry is configured to include in the composite data a control bit indicative of whether the soft data is included in the composite data. In other embodiments, the circuitry is configured to include the output storage values in the composite data but not the confidence levels, and to further include in the composite data an indication that the confidence levels are not included in the composite data. In yet other embodiments, the circuitry is configured to compress the confidence levels by applying a lossy data compression scheme to the confidence levels.

In an embodiment, the circuitry is configured to apply the lossy data compression scheme by limiting a number of confidence levels among the multiple confidence levels having a selected confidence level value, to a predefined limit number. In another embodiment, the circuitry is configured to store the confidence levels in a buffer of the apparatus, and to perform a combined copy and compression operation that produces the compressed soft data during the copy of the soft data from the buffer to an output buffer for transferring to the memory controller.

There is additionally provided, in accordance with an embodiment that is described above, a method for data storage, including, in a storage apparatus that includes a plurality of memory cells, storing data in a group of multiple memory cells by writing multiple respective input storage values to the memory cells in the group. Respective output storage values are read from the memory cells in the group after storing the data. For the output storage values multiple respective confidence levels are generated. Composite data that includes the output storage values is produces. A predefined condition that depends on the confidence levels is tested. Upon detecting that the condition is met, the confidence levels are compressed to produce compressed soft data, and the compressed soft data is included in the composite data. The composite data is transferred over an interface to a memory controller.

These and other embodiments will be more fully understood from the following detailed description of the embodiments thereof, taken together with the drawings in which:

DETAILED DESCRIPTION OF EMBODIMENTS

Overview

Data is typically stored in memory cells of a nonvolatile memory by writing respective storage values to the memory cells. The storage operation programs each memory cell to one of several programming states, which represent respective data values. Data that is stored in memory cells may have varying levels of confidence, i.e., different likelihoods that the data read from the memory cells truly reflects the data that was stored in the memory cells.

Typically, the storage values (e.g., threshold voltages) of the memory cells that are associated with a given programming state have a certain statistical distribution. When the storage value distributions of different programming states overlap, storage values that lie in boundary regions between adjacent programming states might cause read errors. Such storage values may be regarded as having low confidence levels. Storage values that lie in the middle of the distributions, on the other hand, are more likely to be reliable.

The performance of data readout from the memory cells can be improved by considering the confidence levels of the different storage values. For example, in some data storage schemes, an Error Correction Code (ECC) unit encodes the data for storage with an ECC and decodes the ECC when retrieving the data. Some ECC decoders decode the ECC by operating on soft metrics. The confidence levels of the read storage values can be used to produce such soft metrics.

Transferring the confidence levels from the memory cells to the ECC decoder typically adds a considerable amount of communication traffic between the two. A typical read operation retrieves data from thousands of memory cells simultaneously. Transferring the confidence levels assigned to these read results may require an exceedingly high communication rate. The high communication rate can be especially problematic when the memory cells and the ECC decoder reside in separate devices.

Embodiments that are described hereinbelow provide improved methods and systems for data readout from memory cells. The methods and systems described herein estimate the confidence levels of the storage values. Composite data to be transferred to the memory controller includes the storage values, and conditionally includes a compressed version of the confidence levels. For example, the compressed confidence levels may be included in the composite data only when at least one of the confidence levels is indicative of a corresponding unreliable storage value. Since most of the storage values tend to be reliable, and only a small fraction of the storage values have low confidence levels, the compressed confidence levels are rarely transferred, which considerably reduces the amount of composite data transferred.

In the description that follows, the term "confidence levels" is also referred to as "soft data" and these terms are used interchangeably. Similarly, the term "compressed confidence levels" is also referred to as "compressed soft data" and these terms are used interchangeably.

The compression of confidence levels, when used, is typically efficient, again since most of the storage values tend to be reliable. In other words, confidence levels often exhibit little or no variability from one storage value to another, and therefore lend themselves to highly efficient compression.

Upon arrival at the ECC decoder, the confidence levels are recovered from the composite data and used for decoding the ECC.

Consider an embodiment of an apparatus for data storage, including circuitry and a plurality of memory cells. The circuitry is configured to store data in a group of multiple memory cells by writing multiple respective input storage values to the memory cells in the group, to read respective output storage values from the memory cells in the group after storing the data, to generate for the output storage values multiple respective confidence levels, to produce composite data that includes the output storage values, and to test a predefined condition that depends on the confidence levels. The circuitry is further configured to, upon detecting that the condition is met, compress the confidence levels to produce compressed soft data and include the compressed soft data in the composite data, and to transfer the composite data over an interface to a memory controller.

In some embodiments, the circuitry detects that the condition is met based on the number of confidence levels among the multiple confidence levels having a selected confidence level value. For example, the circuitry detects that the condition is met in response to identifying that at least one of the confidence levels is indicative of a low level of confidence compared to another of the confidence levels.

In some embodiments, the circuitry may produce the compressed soft data dependently on the output storage values. For example, the circuitry determines an index of a confidence level having a selected confidence value, calculates a count of the output storage values having a selected storage value in a range of indices below the index, and includes in the compressed soft data a binary representation of the calculated count. In other embodiments, the circuitry may produce the compressed soft data independently of the output storage values. For example, the circuitry determines an index of a confidence level having a selected confidence value, and includes in the composite data a binary representation of the index.

In some embodiments, the circuitry includes in the composite data a control bit indicative of whether the compressed soft data is included in the composite data. In an example embodiment, the circuitry includes the output storage values in the composite data but not the confidence levels, and further includes in the composite data an indication that the confidence levels are not included in the composite data.

The circuitry may compress the confidence levels using, for example, a lossy data compression scheme. In such embodiments, the circuitry may apply the lossy data compression scheme by limiting the number of confidence levels among the multiple confidence levels having a selected confidence level value (e.g., a low confidence level), to a predefined limit number. In an embodiment, the limit number may be set to two.

In an embodiment, the circuitry is configured to store the confidence levels in a buffer of the apparatus, and to perform a combined copy and compression operation that produces the compressed soft data during the copy of the soft data from the buffer to an output buffer for transferring to the memory controller.

Using the disclosed embodiments, a high readout throughput in transferring hard data and confidence levels can be attained, that improves over known schemes. Moreover, the disclosed embodiments have low complexity and are implementable within the memory device and memory controller.

System Description

Figure 1:
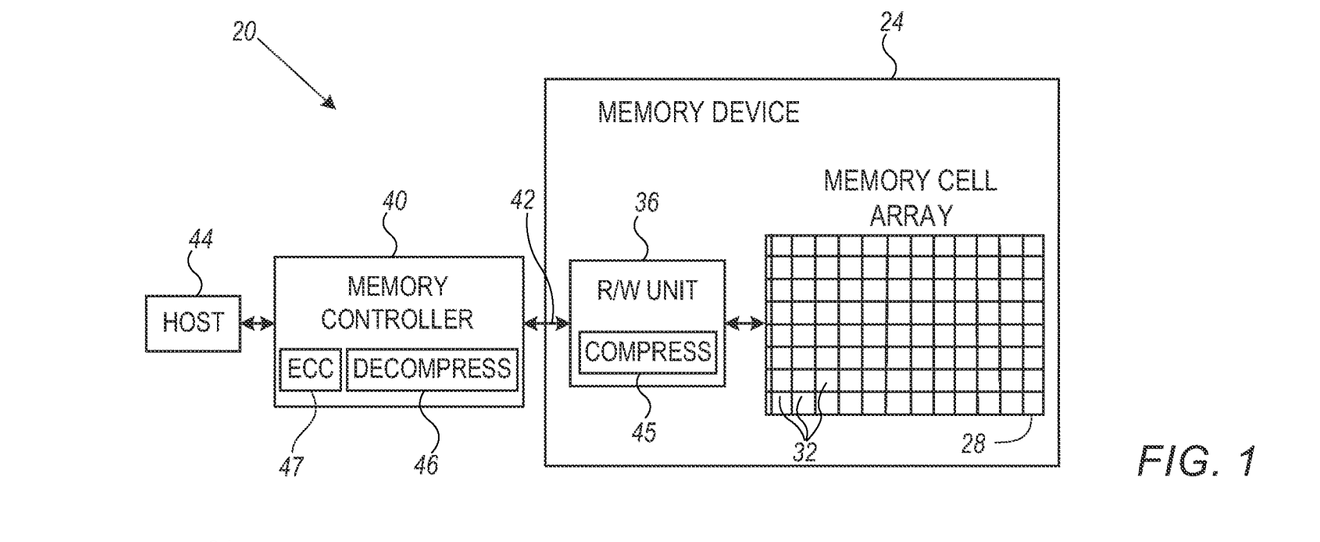
FIG. 1 is a block diagram that schematically illustrates a memory system, in accordance with an embodiment that is described herein.

FIG. 1 is a block diagram that schematically illustrates a memory system 20, in accordance with an embodiment that is described herein. System 20 can be used in various host systems and devices, such as in computing devices, cellular phones or other communication terminals, removable memory modules ("disk-on-key" devices), Solid State Disks (SSD), digital cameras, music and other media players and/or any other system or device in which data is stored and retrieved.

System 20 includes a memory device 24 that stores data in a memory cell array 28. The memory cell array includes multiple memory cells 32. The term "memory cell" is typically used to describe any memory cell that holds a continuous, analog level of a physical quantity, such as an electrical voltage or charge. Memory cell array 28 may include memory cells of any kind, such as, for example, NAND, NOR and CTF Flash cells, PCM, NROM, FRAM, MRAM and DRAM cells. Memory cells 32 may include Single-Level Cells (SLC) or Multi-Level Cells (MLC, also referred to as multi-bit cells). Alternatively, memory cells that store a higher number of bits per cell, such as Triple-Level Cells (TLC) and Quad-Level Cells (QLC) can also be used.

The charge levels stored in the memory cells and/or the analog voltages or currents written into and read out of the cells are referred to herein collectively as analog values or storage values. Although the embodiments described herein mainly address threshold voltages, the methods and systems described herein may be used with any other suitable kind of storage values.

System 20 stores data in memory cells 32 by programming the memory cells to assume respective memory states, which are also referred to as programming levels. The programming states are selected from a finite set of possible states, and each state corresponds to a certain nominal storage value. For example, a 2 bit/cell MLC can be programmed to assume one of four possible programming states by writing one of four possible nominal storage values to the cell. Alternatively, memory cells that store a higher number of bits per cell such as TLC memory cells that store three bits per cell and QLC memory cells that store four bits per cell can also be used.

Memory device 24 includes a reading/writing (R/W) unit 36, which converts data for storage in the memory device to storage values and writes them into memory cells 32. In alternative embodiments, the R/W unit does not perform the conversion, but is provided with voltage samples, i.e., with the storage values for storage in the cells. When reading data out of memory cell array 28, R/W unit 36 converts the storage values of memory cells 32 into digital samples having a resolution of one or more bits. The R/W unit typically reads data from memory cells 32 by comparing the storage values of the cells to one or more read thresholds. Data is typically written to and read from the memory cells in groups that are referred to as pages. In some embodiments, the R/W unit can erase a group of cells 32 by applying one or more negative erasure pulses to the memory cells.

The storage and retrieval of data in and out of memory device 24 is performed by a memory controller 40, which communicates with device 24 over a suitable interface 42. In some embodiments, memory controller 40 produces the storage values for storing in the memory cells and provides these values to R/W unit 36. Alternatively, memory controller 40 may provide the data for storage, and the conversion to storage values is carried out by the R/W unit internally to the memory device.

Memory controller 40 communicates with a host 44, for accepting data for storage in the memory device and for outputting data retrieved from the memory device. In some embodiments, some or even all of the functions of memory controller 40 may be implemented in hardware. Alternatively, memory controller 40 may include a microprocessor that runs suitable software, or a combination of hardware and software elements.

In some embodiments, R/W unit 36 includes a data compression module 45, which compresses some of the information that is to be sent to memory controller 40. The memory controller includes a decompression module 46, which decompresses the compressed information received from memory device 24. In particular, R/W unit 36 may produce confidence levels of the storage values read from memory cells 32, and data compression module 45 may compress these confidence levels and send the compressed confidence levels to memory controller 40. (In some embodiments, data compression module 45 can also be used for compressing other types of information, such as stored data that is retrieved from memory cells 32.)

In some embodiments, the memory device performs two read operations to produce two local readouts using two respective pre-assigned read thresholds. Based on the two local readouts, the memory device determines hard storage values and associated binary confidence levels to be transferred to the memory controller. For example, memory cells whose threshold voltages fall between the two read thresholds are considered as having low reliability, whereas memory cells whose threshold voltages fall below or above the two read thresholds are considered as having high reliability. In alternative embodiments, more than two read thresholds may be used to produce multiple groups of confidence levels.

The memory controller uses the storage values read from memory cells 32, and the associated confidence levels, to reconstruct the stored data. For example, memory controller 40 may include an Error Correction Code (ECC) unit 47, which encodes the data for storage using a suitable ECC, and decodes the ECC of the data retrieved from memory cells 32. ECC unit 47 may apply any suitable type of ECC, such as, for example, a Low-Density Parity Check (LDPC) code or a Bose-Chaudhuri-Hocquenghem (BCH) code. In some embodiments, ECC unit 47 uses the confidence levels to improve the ECC decoding performance. Several example methods for obtaining and compressing confidence levels, as well as for using the confidence levels in ECC decoding, are described, for example, in a U.S. Pat. No. 8,230,300, whose disclosure is incorporated herein by reference. (In the event of any inconsistencies between any incorporated document and this document, it is intended that this document control.)

The memory system configuration of FIG. 1 is an example memory system configuration, which is shown purely for the sake of conceptual clarity. Any other suitable memory system configuration can also be used. Elements that are not necessary for understanding the principles of the present invention, such as various interfaces, addressing circuits, timing and sequencing circuits and debugging circuits, have been omitted from the figure for clarity.

In the example system configuration shown in FIG. 1, memory device 24 and memory controller 40 are implemented as two separate Integrated Circuits (ICs). In alternative embodiments, however, the memory device and the memory controller may be integrated on separate semiconductor dies in a single Multi-Chip Package (MCP) or System on Chip (SoC), and may be interconnected by an internal bus. Further alternatively, some or all of the circuitry of the memory controller may reside on the same die on which the memory array is disposed. Further alternatively, some or all of the functionality of memory controller 40 can be implemented in software and carried out by a processor or other element of the host system. In some embodiments, host 44 and memory controller 40 may be fabricated on the same die, or on separate dies in the same device package.

In some implementations, a single memory controller may be connected to multiple memory devices 24. In yet another embodiment, some or all of the memory controller functionality may be carried out by a separate unit, referred to as a memory extension, which acts as a slave of memory device 24. Typically, memory controller 40 includes a general-purpose processor, which is programmed in software to carry out the functions described herein. The software may be downloaded to the processor in electronic form, over a network, for example, or it may, alternatively or additionally, be provided and/or stored on tangible media, such as magnetic, optical, or electronic memory.

Memory cells 32 of memory cell array 28 are typically arranged in a grid having multiple rows and columns, commonly referred to as word lines and bit lines, respectively. The memory array is typically divided into multiple pages, i.e., groups of memory cells that are programmed and read simultaneously. Memory cells 32 are typically erased in groups of word lines that are referred to as erasure blocks. In some embodiments, a given memory device includes multiple memory cell arrays, which may be fabricated on separate dies.

In the description that follows and in the claims, the term "circuitry" refers to elements of memory device 24, excluding interface 42 and memory cell array 28. In the example of FIG. 1, the circuitry includes R/W unit 36, including data compression module 45.

Schemes for Producing Composite Data for High Throughput Transfer

As described, for example, in U.S. Pat. No. 8,230,300, assigning confidence levels to hard bits of an ECC code word read from memory typically improves the decoding capability of the ECC code word, significantly. The hard data and the confidence levels are typically produced within the memory device and transferred to the memory controller. In some embodiments, to reduce the amount of information transferred over the interface that interconnects between the memory device and the memory controller, the memory device applies a suitable data compression scheme to the confidence levels and transfers the confidence levels to the memory controller in a compressed form. The memory controller recovers the confidence levels by applying a suitable decompression scheme and uses the hard data and the recovered confidence levels to perform an ECC soft decoding scheme to recover the unencoded data.

It is now demonstrated that composite data in which the data compression scheme applied to the soft data depends on the hard data may be represented with a smaller number of bits compared to composite data in which the data compression scheme is independent of the hard data. Let $S_n$ denote a sequence of soft bits that get a value "1" with probability P and a value "0" with probability (1−P). The entropy of this sequence $H(S_n)$ is given by:

$$H(S_n) = -\text{Log}_2(P) \cdot P - \text{Log}_2(1-P) \cdot (1-P) [\text{Bits}] \qquad \text{Equation 1}$$

The minimal number of bits required for representing a sequence of random hard bits $H_n$ (whose entropy equals 1) and corresponding soft bits $S_n$ is thus given by:

$$N_{S+H} = 1 + H(S_n) = 1 - \text{Log}_2(P) \cdot P - \text{Log}_2(1-P) \cdot (1-P) [\text{Bits}] \qquad \text{Equation 2}$$

Consider a sequence of composite data $C_n$ that incorporates information from both sequences of hard bits and soft bits. The composite sequence has the following statistical properties:

$$C_n = \begin{cases} 10 & \text{with probbility } (1-P)/2 \\ 01 & \text{with probability } P \\ 00 & \text{with probaility } (1-P)/2 \end{cases} \qquad \text{Equation 3}$$

In Equation 3, the most significant bit (left bit) corresponds to the hard data and the least significant bit (right bit) corresponds to the soft data. The minimal number of bits required for representing $C_n$ is given by:

$$N_c = -\text{Log}_2(P) \cdot P - \text{Log}_2\left(\frac{1-P}{2}\right) \cdot \left(\frac{1-P}{2}\right) [\text{Bits}] \qquad \text{Equation 4}$$

and after rearrangement, $$N_C = N_{S+H} - P [\text{Bits}] \qquad \text{Equation 5}$$

This means that $N_c \leq N_{S+H}$, and therefore transmission of the composite sequence may require a smaller bandwidth compared to the transmission of the hard data and soft data independently of one another.

Next is described a class of low-complexity schemes that may be used for producing low-bandwidth composite data based on both the hard and soft data. Further below, example schemes of this class that attain compression rates close to the theoretical bounds will be described.

Figure 2:
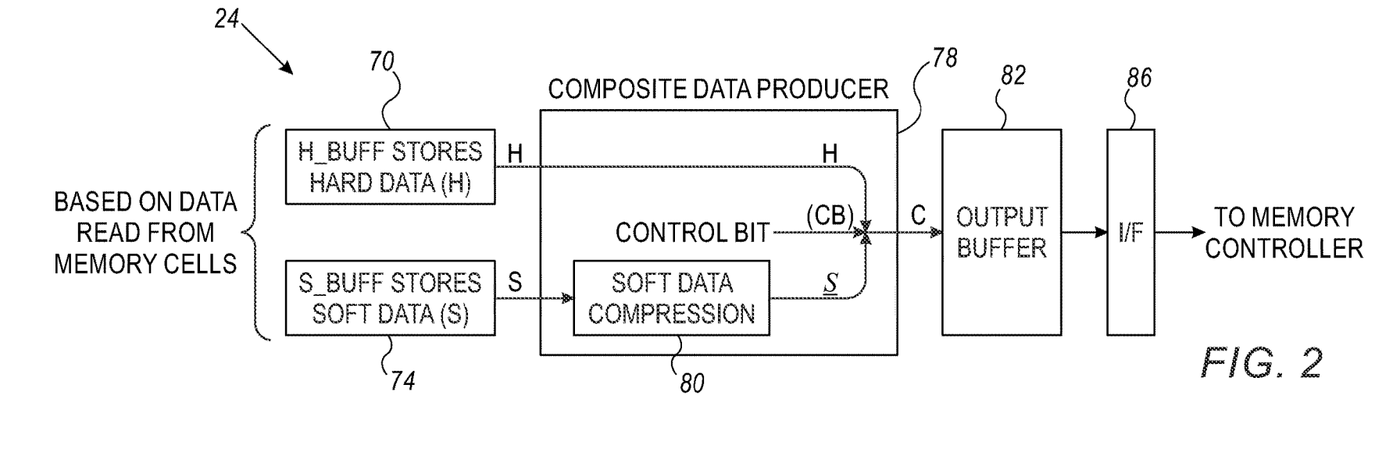
FIG. 2 is a block diagram that schematically illustrates a scheme for producing hard data and confidence levels for efficient transfer to a memory controller, in accordance with embodiments that are described herein.

FIG. 2 is a block diagram that schematically illustrates a scheme for producing hard data and confidence levels for efficient transfer to a memory controller, in accordance with embodiments that are described herein.

The scheme in FIG. 2 may be used in implementing at least part of memory device of FIG. 1, including data compression module 45.

Memory device 24 in FIG. 2 includes a buffer 70 denoted "hard buffer" or "H_BUFF" that stores hard data bits read from memory array 28, and another buffer 74 denoted "soft buffer" or "S_BUFF" that stores confidence levels that R/W unit 36 respectively assigns to the hard data bits. A sequence of hard data bits is referred to as "hard data" and is denoted H. A sequence of soft data bits (the confidence levels) is referred to as "soft data" and is denoted S.

In FIG. 2, memory device 24 includes a composite data producer 78, which produces a sequence of composite data bits, denoted C, based on both the hard data H and the soft data S. As will be described below, composite data producer 78 conditionally applies a suitable data compression scheme to the soft data S.

The memory device stores the composite data C in an output buffer 82 and transfers the composite data from the output buffer to memory controller 40 over a suitable interface 86 (Interface 86 may implement interface 42 in FIG. 1).

Composite data producer 78 includes a data compression module 80 that when requested applies a suitable data compression scheme to the soft data S for producing compressed soft data denoted $\underline{S}$. Data compression module 80 is also referred to as a "data compressor." In some embodiments, data compressor 80 applies a joint data compression method that compresses the soft data S depending on the hard data H. In other embodiments, data compressor 80 applies an independent data compression scheme that compresses the soft data S independently of the hard data H. Composite data producer 78 includes the hard data H in C, and conditionally includes the compressed soft data $\underline{S}$ in C. The composite data producer additionally includes a control bit (denoted "CB") that indicates whether the composite data C includes the compressed soft data $\underline{S}$, or not.

In some embodiments, composite data producer 78 produces the composite data C as given by:

$$C = \begin{Bmatrix} [H, CB = 0] & N1 = 0 \\ [H, CB = 1, \underline{S}] & N1 > 0 \end{Bmatrix} \quad \text{Equation 6}$$

In Equation 6, C denotes a composite data sequence derived from (i) a sequence H containing a number W of hard data bits, and (ii) a sequence S of W confidence levels that are respectively assigned to the W hard data bits in H. Further in Equation 6, $\underline{S}$ denotes compressed soft data derived from S (e.g., using data compressor 80), and N1 denotes a non-negative integer number of the low confidence levels in the uncompressed soft data S. In the present example, the confidence levels have two possible values denoted "0" and "1", wherein a "0" value refers to a high confidence level and a "1" value refers to a low confidence level.

The number (N1) of confidence levels in S having a "1" value (low confidence) is typically much smaller than the number (W−N1) of confidence levels in S having a "0" value (high confidence).

The control bit (CB) in Equation 6 distinguishes between cases in which N1 equals zero (in which case $\underline{S}$ may be omitted from C), and cases in which N1 has a positive non-zero value (and $\underline{S}$ is included in C). When N1 equals zero, the uncompressed soft data S contains only high confidence levels. In this case C includes H and the control bit CB set to "0", but $\underline{S}$ is omitted. On the other hand, when N1>0, S contains one or more low confidence levels, in which case C includes H, the control bit CB set to "1", and a compressed version $\underline{S}$ of S.

Since most of the hard data bits are read reliably, N1 equals zero with high probability, and the compressed soft data $\underline{S}$ is rarely calculated and included in C. Consequently, the scheme in Equation 6 produces composite data that is much shorter (on average) than the length W of the hard data H plus the length of the compressed soft data $\underline{S}$.

At the memory controller side, the memory controller receives the composite data C, and reproduces C to recover H and $\underline{S}$. The memory controller extracts from C, the W hard bits of H and the control bit CB. When the control bit equals "0", the memory controller recovers $\underline{S}$ by setting all the W confidence levels in S to a high confidence level. Otherwise, the memory controller extracts from C the compressed confidence levels $\underline{S}$, and decompresses $\underline{S}$ to recover the W confidence levels in S, as will be described further below.

In some embodiments, data compressor 80 produces $\underline{S}$ by applying to S a lossy data compression scheme. In some embodiments, in performing this lossy data compression scheme, the number of confidence levels in S having a low confidence level is limited to a predefined maximal number denoted N1max. In example embodiments that will be described below, before applying data compression to S, the number of low confidence levels in S, is limited to N1max=2, so that when S contains more than N1max low confidence levels, the R/W unit zeros the excessive low confidence levels.

In some embodiments, hard buffer 70 and soft buffer 74 are inaccessible directly to interface 86, but only via output buffer 82. In a typical implementation, shortly before the actual transmission of a composite data sequence through interface 86, the hard data from the hard buffer and the data from the soft buffer are copied to the output buffer.

In some embodiments, at least part of the scheme for producing the composite data may be implemented by copying of fixed quotas of bits from the hard buffer followed by provisional quotas of compressed confidence levels from the soft data buffer. In some embodiments, to reduce readout latency, the memory device synchronizes between operations of (i) copy hard data from the hard buffer to the output buffer and (ii) copy soft data from the soft buffer to the output buffer while applying data compression to the soft data. In (ii), the memory device performs a combined copy and compression operation that produces the compressed soft data during the copy of the soft data from the soft buffer to the output buffer, for transferring (as part of the composite data) to the memory controller.

In some embodiments, during internal copy operations within the memory device, no other internal operations may be performed. This may degrade the readout throughput due to performing separate copy operations to hard data and soft data over distinct time periods. By performing the two copy operations in parallel to one another, as described above, the latency reduces considerably.

It should be noted that parallel copy of the hard and soft data to the output buffer as described above is not mandatory. In other embodiments, the copy and compression operation of the soft data may be carried out immediately after (or before) the copy operation of the hard data, with no (or minimal) time gap in between.

Low-density storage systems often operate in a pipeline mode, in which the next sense operation (reading from the memory array) is performed in parallel to transmitting previously read data over the interface of the memory device. This means that the sense operation may start after copying the hard data, soft data or both, to the output Buffer. In some embodiments, this is done efficiently by copying the hard data and soft data in parallel to one another, as described above.

An Example Joint Compression Scheme

As noted above, in some embodiments, data compressor 80 applies to the soft data S and hard data H a joint data compression scheme, in which the soft data S is compressed depending on the actual content of the hard data H.

A method for producing compressed confidence levels $\underline{S}$ dependently on the hard data H is now described.

Figure 3:
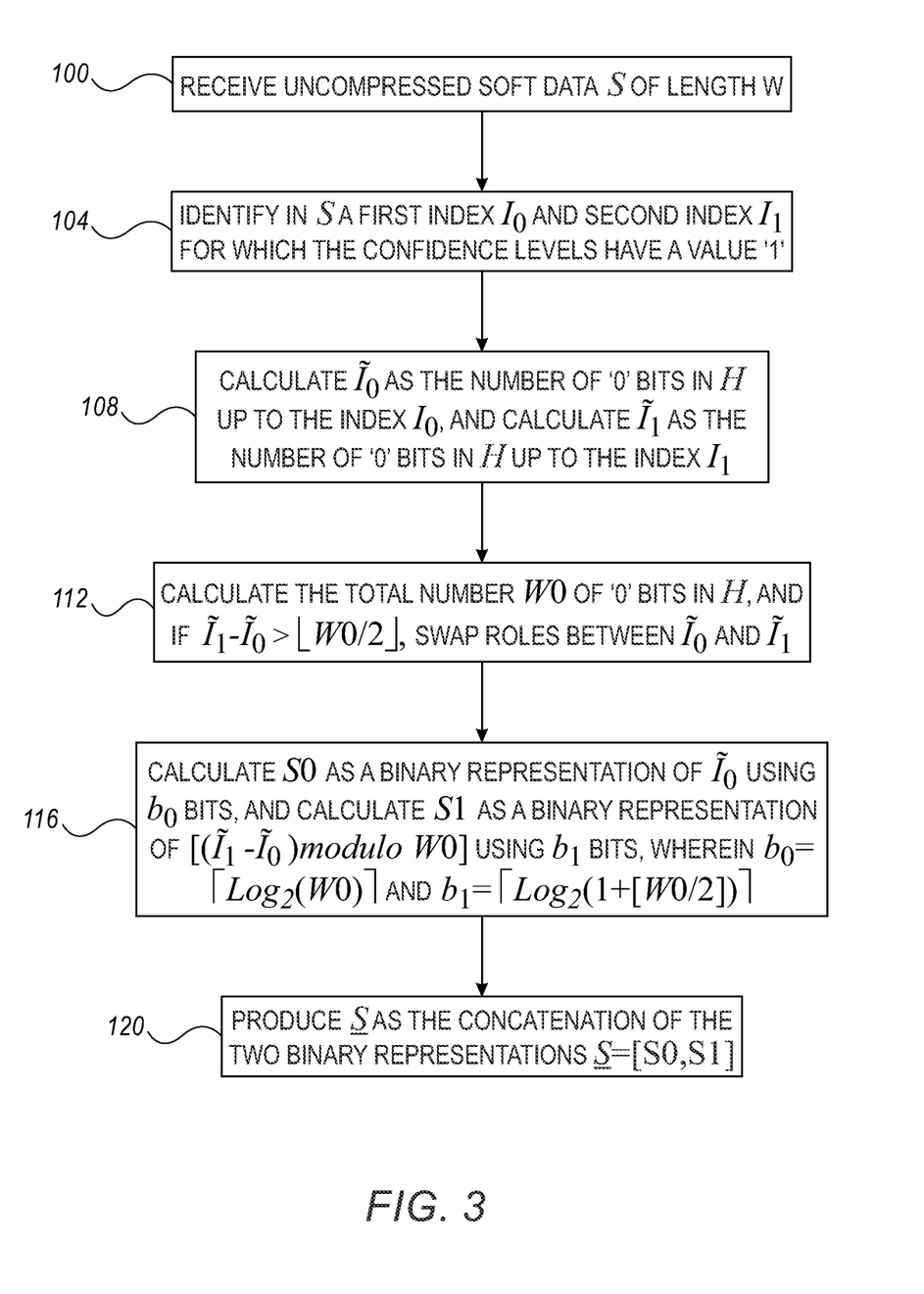
FIG. 3 is a flow chart that schematically illustrates a method for joint data compression of hard data and corresponding soft confidence levels, in accordance with an embodiment that is described herein.

FIG. 3 is a flow chart that schematically illustrates a method for joint data compression of hard data and corresponding soft confidence levels, in accordance with an embodiment that is described herein.

The method will be described as executed by data compressor 80.

The method begins at a reception stage 100, with data compressor 80 receiving uncompressed soft data S that includes a number W of binary-valued confidence levels. At a soft indices identification stage 104, the data compressor identifies in S a first index $I_0$ and second index $I_1$ for which the confidence levels have a value "1" (a low confidence level). When at stage 100 S contains a single confidence level having a "1" value, the data compressor sets $I_0=I_1$. At a zero sequences identification stage 108, the data compressor calculates $\tilde{I}_0$ as the number of "0" bits in H up to the index $I_0$ (e.g., having indices between 0 and $\tilde{I}_0-1$), and calculates $\tilde{I}_1$ as the number of "0" bits in H up to the index $I_1$ (e.g., having indices between 0 and $\tilde{I}_1-1$), e.g., using expressions given by:

$$\tilde{I}_0 = \sum_{k=0}^{I_0-1} !(H_k)$$ Equation 7

$$\tilde{I}_1 = \sum_{k=0}^{I_1-1} !(H_k)$$ Equation 8 wherein in Equations 7 and 8, $H_k$ denotes the kth element in H, and the operator $!(\bullet)$ denotes a logical binary inversion operator.

At a conditional swapping stage 112, the data compressor calculates the total number W0 of "0" bits in H, and upon identifying that $\tilde{I}_1-\tilde{I}_0 > \lfloor W0/2 \rfloor$, swaps roles between $\tilde{I}_0$ and $\tilde{I}_1$.

At a binary representation stage 116, the data compressor calculates numbers of bits $b_0$ and $b_1$ given by:

$$b_0 = \lceil \log_2(W0) \rceil$$

$$b_1 = \lceil \log_2(1+\lfloor W0/2 \rfloor) \rceil$$ Equation 9 and calculates S0 and as a binary representation of $\tilde{I}_0$ using a number $b_0$ of bits, and calculates S1 as a binary representation of $[(\tilde{I}_1-\tilde{I}_0) \bmod W0]$ using a number $b_1$ of bits.

At a final compression stage 120, the data compressor produces $\underline{S}$ as the concatenation of the two binary representations as given by $\underline{S}=[S0,S1]$. Following stage 120 the method terminates.

Figure 4:
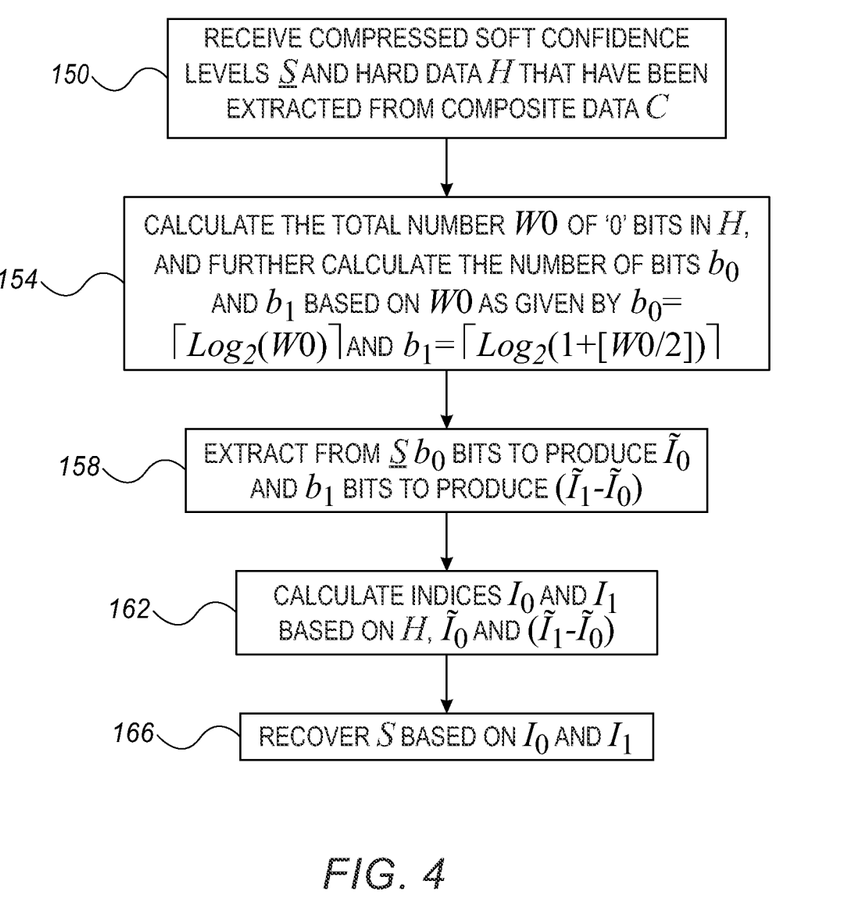
FIG. 4 is a flow chart that schematically illustrates a method for data decompression of soft confidence levels that were jointly compressed with hard data, in accordance with an embodiment that is described herein.

FIG. 4 is a flow chart that schematically illustrates a method for data decompression of soft confidence levels that were jointly compressed with hard data, in accordance with an embodiment that is described herein.

The method will be described as executed by memory controller 40, e.g., by decompression module 46. The method may be applied to soft data compressed using the method of FIG. 3.

The method of FIG. 4 begins at an input stage 150, with decompression module 46 receiving compressed soft confidence levels $\underline{S}$ and hard data H that have been extracted from composite data C as described above. At a bit-number calculation stage 154, the decompression module calculates the total number W0 of "0" bits in H, and further calculates the numbers of bits $b_0$ and $b_1$ based on W0 as given in Equation 9 above. At a numbers of hard bits determination stage 158, decompression module 46 extracts from $\underline{S}$ a number of $b_0$ bits to produce $\tilde{I}_0$, and a number of $b_1$ bits to produce $(\tilde{I}_1-\tilde{I}_0)$.

At an indices-calculation stage 162 the decompression module calculates the indices $I_0$ and $I_1$ based on H, $\tilde{I}_0$ and $(\tilde{I}_1-\tilde{I}_0)$, and at a decompression stage 166 recovers S based on $I_0$ and $I_1$. Following stage 166 the method terminates.

Using computer simulations, the inventors tested the joint compression scheme described above, for a number W=63 of hard bits in H, and a probability of a "1" valued confidence level of P=0.02. The effective compression rate under these conditions is given by CRjoint=0.13. The compression rate (CRjoint in this example) is measured relative to the length of S and is given by [length (C)–length (H)]/length (S).

An Example Independent Compression Scheme

In this section, an example compression and decompression schemes are provided, in which the confidence levels S are compressed independently of the hard data bits H.

Figure 5:
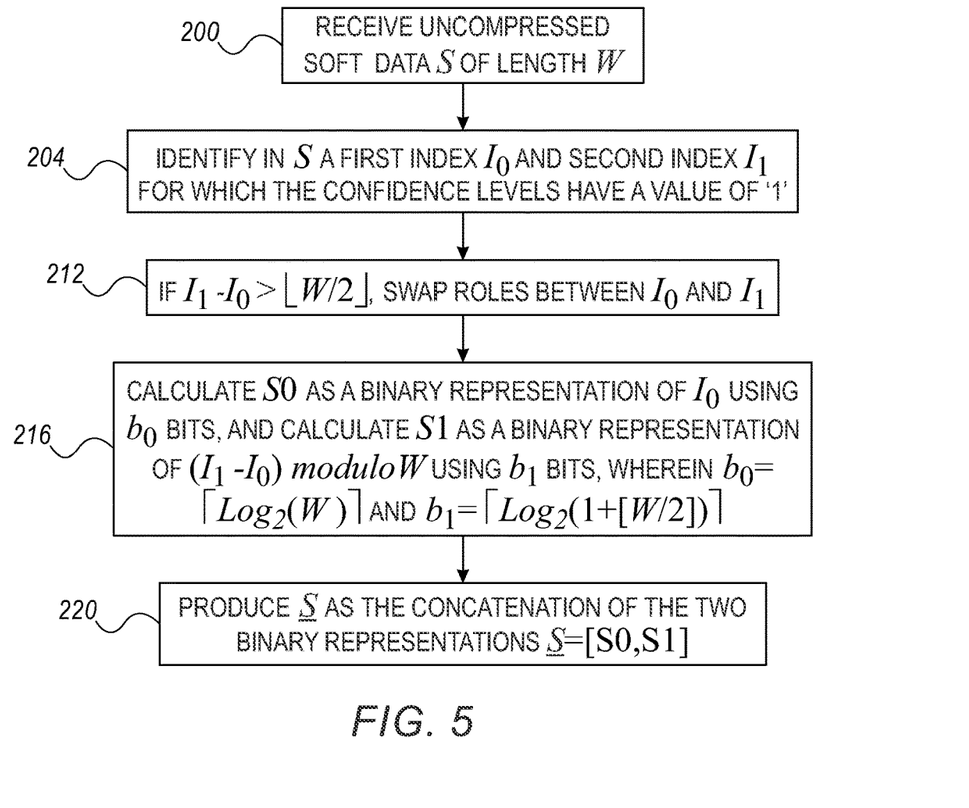
FIG. 5 is a flow chart that schematically illustrates a method for data compression, in which soft confidence levels are compressed independently of corresponding hard data, in accordance with an embodiment that is described herein.

FIG. 5 is a flow chart that schematically illustrates a method for data compression, in which soft confidence levels are compressed independently of corresponding hard data, in accordance with an embodiment that is described herein.

The method will be describe as executed by data compressor 80.

The method begins at a reception stage 200, with data compressor 80 receiving uncompressed soft data S that includes a number W of binary-valued confidence levels. At a soft indices calculation stage 204, the data compressor identifies a first index $I_0$ and second index $I_1$ in S having a confidence level value "1" (a low confidence level). If S contains a single confidence level having a "1" value, the data compressor sets $I_0=I_1$.

At a conditional swapping stage 212, the data compressor checks whether $I_1-I_0 > \lceil W/2 \rceil$, and if so, swaps roles between $I_0$ and $I_1$.

At a binary representation stage 216, the data compressor calculates numbers of bits $b_0$ and $b_1$ as given by Equation 9 in which W replaces W0, calculates S0 as a binary representation of $I_0$ using $b_0$ bits, and calculates S1 as a binary representation of $(I_1-I_0)$ modulo W using $b_1$ bits. At a final compression stage 220, the data compressor produces $\underline{S}$ as the concatenation of the two binary representations as given by $\underline{S}=[S0,S1]$. Following stage 220 the method terminates.

Figure 6:
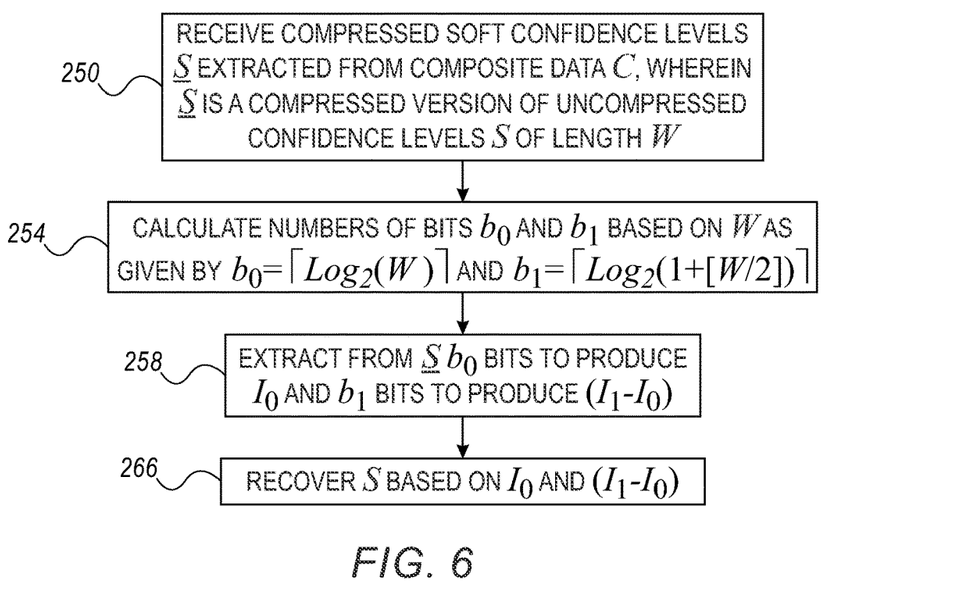
FIG. 6 is a flow chart that schematically illustrates a method for data decompression of soft confidence levels that were compressed independently of corresponding hard data, in accordance with an embodiment that is described herein.

FIG. 6 is a flow chart that schematically illustrates a method for data decompression of soft confidence levels that were compressed independently of corresponding hard data, in accordance with an embodiment that is described herein.

The method will be described as executed by memory controller 40, e.g., by decompression module 46. The method may be applied to data compressed using the method of FIG. 5 above.

The method begins at an input stage 250, with decompression module 46 receiving compressed soft confidence levels $\underline{S}$ extracted from composite data C as described above. $\underline{S}$ includes a compressed version of uncompressed confidence levels S of length W.

At a bit-number calculation stage 254, the decompression module calculates the numbers of bits $b_0$ and $b_1$ based on W as given in Equation 9 above in which W replaces W0. At an indices-determination stage 258, decompression module 46 extracts from $\underline{S}$ a number of by bits to produce an index $I_0$, and a number of $b_1$ bits to produce an indices difference $(I_1-I_0)$, and at a decompression stage 266 recovers S based on $I_0$ and $(I_1-I_0)$. Following stage 266 the method terminates.

The performance of the independent compression scheme in the method of FIG. 5 is analyzed herein. The average compression ratio attained by the method of FIG. 5 is given by:

$$CR = \frac{1}{W}[P0(W+1) + (1-P0)(W+1+\text{Length}(\underline{S}))] \quad \text{Equation 10}$$

Wherein P0 is given by $P0=(1-P)^W$. The compression rate in Equation 10 is minimized when the length of $\underline{S}$ is minimized. Specifically, a condition for minimizing the length of the compressed confidence levels $\underline{S}$ is given by:

$$\min \text{length}(\underline{S}) = \left\lceil \text{Log}_2\left(\sum_{k=1}^{Nmax}\binom{W}{k}\right)\right\rceil \quad \text{Equation 11}$$

In Equation 11, Nmax denotes the maximal number of "1" values in a sequence of W confidence levels.

Based on Equations 9 and 10, the optimal compression ratio is given by:

$$CRopt = \frac{1}{W}\left[P0(W+1) + (1-P0)\left(W+1+\left\lceil \text{Log}_2\left(\sum_{k=1}^{Nmax}\binom{W}{k}\right)\right\rceil\right)\right] \quad \text{Equation 12}$$

It can be shown that for a length W=63, the minimal length of $\underline{S}$ is 11 bits. Moreover, the proposed independent compression scheme achieves an optimal compression rate as given in Equation 12.

Using computer simulations, under the conditions W=63 and P=0.02, the resulting compression ratio is given by CRindependent=0.14. This result demonstrates that the joint compression scheme of FIG. 3 above (having a compression ratio 0.13) outperforms the independent compression scheme of FIG. 5.

The embodiments described above are given by way of example, and other suitable embodiments can also be used.

Although the embodiments described herein mainly address compression of confidence levels related to data retrieved from a memory, the methods and systems described herein can also be used in other applications, such as in applying data compression to other types of sparse data.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An apparatus for data storage, comprising:
a plurality of memory cells; and
circuitry configured to:
    store data in a group of multiple memory cells by writing multiple respective input storage values to the memory cells in the group;
    read respective output storage values from the memory cells in the group after storing the data;
    generate for the output storage values multiple respective confidence levels;
    test a predefined condition that depends on the confidence levels;
    upon detecting that the condition is met, compress the confidence levels to produce compressed soft data, and produce composite data including both the output storage values and the compressed soft data;
    upon detecting that the condition is not met, produce the composite data including the output storage values but not the compressed soft data; and
    transfer the composite data over an interface to a memory controller.

2. The apparatus according to claim 1, wherein the circuitry is configured to detect that the condition is met based on a number of confidence levels among the multiple confidence levels having a selected confidence level value.

3. The apparatus according to claim 2, wherein the circuitry is configured to detect that the condition is met in response to identifying that at least one of the confidence levels is indicative of a low level of confidence compared to another of the confidence levels.

4. The apparatus according to claim 1, wherein the circuitry is configured to produce the compressed soft data independently of the output storage values.

5. The apparatus according to claim 1, wherein the circuitry is configured to produce the compressed soft data dependently on the output storage values.

6. The apparatus according to claim 1, wherein the circuitry is configured to determine an index of a confidence level having a selected confidence value, to calculate a count of the output storage values having a selected storage value in a range of indices below the index, and to include in the compressed soft data a binary representation of the calculated count.

7. The apparatus according to claim 1, wherein the circuitry is configured to determine an index of a confidence level having a selected confidence value, and to include in the composite data a binary representation of the index.

8. The apparatus according to claim 1, wherein the circuitry is configured to include in the composite data a control bit indicative of whether the compressed soft data is included in the composite data.

9. The apparatus according to claim 1, wherein the circuitry is configured to, upon detecting that the condition is not met, further include in the composite data an indication that the compressed soft data is not included in the composite data.

10. The apparatus according to claim 1, wherein the circuitry is configured to compress the confidence levels by applying a lossy data compression scheme to the confidence levels.

11. The apparatus according to claim 10, wherein the circuitry is configured to apply the lossy data compression scheme by limiting a number of confidence levels among the multiple confidence levels having a selected confidence level value, to a predefined limit number.

12. The apparatus according to claim 1, wherein the circuitry is configured to store the confidence levels in a buffer of the apparatus, and to perform a combined copy and compression operation that produces the compressed soft data while copying the confidence levels from the buffer to an output buffer for transferring to the memory controller.

13. A method for data storage, comprising:
- storing data in a group of multiple memory cells by writing multiple respective input storage values to the memory cells in the group;
- reading respective output storage values from the memory cells in the group after storing the data;
- generating for the output storage values multiple respective confidence levels;
- evaluating a predefined condition, which depends on the confidence levels, over multiple sets of output storage values and corresponding confidence levels;
- for one or more of the sets in which the condition is met, compressing the corresponding confidence levels to produce compressed soft data, and producing composite data including both the output storage values and the compressed soft data;
- for at least one of the sets in which the condition is not met, producing the composite data including the output storage values but not the compressed soft data; and
- transferring the composite data over an interface to a memory controller.

14. The method according to claim 13, and comprising detecting for a given set that the condition is met based on a number of confidence levels among the multiple confidence levels having a selected confidence level value.

15. The method according to claim 14, wherein detecting that the condition is met comprises detecting that the condition is met in response to identifying that at least one of the confidence levels is indicative of a low level of confidence compared to another of the confidence levels.

16. The method according to claim 13, wherein compressing the corresponding confidence levels comprises producing the compressed soft data independently of the output storage values.

17. The method according to claim 13, wherein compressing the corresponding confidence levels comprises producing the compressed soft data dependently on the output storage values.

18. The method according to claim 13, and comprising determining an index of a confidence level having a selected confidence value, calculating a count of the output storage values having a selected storage value in a range of indices below the index, and including in the compressed soft data a binary representation of the calculated count.

19. The method according to claim 13, and comprising determining an index of a confidence level having a selected confidence value, and including in the composite data a binary representation of the index.

20. The method according to claim 13, and comprising including in the composite data a control bit indicative of whether the compressed soft data is included in the composite data.

21. The method according to claim 13, and comprising, upon detecting that the condition is not met, further including in the composite data an indication that the compressed soft data is not included in the composite data.

22. The method according to claim 13, wherein compressing the corresponding confidence levels comprises applying a lossy data compression scheme to the confidence levels.

23. The method according to claim 22, wherein applying the lossy data compression scheme comprises limiting a number of confidence levels among the multiple confidence levels having a selected confidence level value, to a predefined limit number.

24. The method according to claim 13, and comprising storing the corresponding confidence levels in a buffer, and performing a combined copy and compression operation that produces the compressed soft data while copying the corresponding confidence levels from the buffer to an output buffer for transferring to the memory controller.

* * * * *